US009159176B2

(12) United States Patent
Okuya et al.

(10) Patent No.: US 9,159,176 B2
(45) Date of Patent: Oct. 13, 2015

(54) VEHICLE IDENTIFICATION APPARATUS AND METHOD

(71) Applicant: DENSO CORPORATION, Kariya, Aichi-pref. (JP)

(72) Inventors: Tsubasa Okuya, Kariya (JP); Masato Matsumoto, Kosai (JP); Kazuyoshi Isaji, Kariya (JP); Kenji Muto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/261,825

(22) Filed: Apr. 25, 2014

(65) Prior Publication Data

US 2014/0324312 A1 Oct. 30, 2014

(30) Foreign Application Priority Data

Apr. 26, 2013 (JP) ................................. 2013-093818

(51) Int. Cl.
*G06F 7/00* (2006.01)
*G07C 5/02* (2006.01)

(52) U.S. Cl.
CPC ........................................ *G07C 5/02* (2013.01)

(58) Field of Classification Search
None
See application file for complete search history.

(56) References Cited

U.S. PATENT DOCUMENTS

| | | | | |
|---|---|---|---|---|
| 2009/0237293 | A1 | 9/2009 | Sakuma | |
| 2013/0282236 | A1 | 10/2013 | Kato et al. | |
| 2014/0292545 | A1* | 10/2014 | Nemoto | 340/988 |

FOREIGN PATENT DOCUMENTS

| | | | |
|---|---|---|---|
| JP | 2007-280060 | A | 10/2007 |
| JP | 2008-046873 | A | 2/2008 |
| JP | 2009-230390 | A | 10/2009 |
| WO | 2012/059973 | A1 | 5/2012 |
| WO | 2013/014755 | A1 | 1/2013 |
| WO | WO 2013014755 | A1 * | 1/2013 |

OTHER PUBLICATIONS

Office Action mailed Mar. 17, 2015 issued in corresponding JP patent application No. 2013-093818 (and English translation).

* cited by examiner

*Primary Examiner* — Thomas Tarcza
*Assistant Examiner* — Garrett Evans
(74) *Attorney, Agent, or Firm* — Posz Law Group, PLC

(57) ABSTRACT

A vehicle identification apparatus mounted in a vehicle provided with a detection unit configured to detect a speed of a first other vehicle and a communication unit configured to receive information indicative of a speed of a second other vehicle from the second other vehicle. In the apparatus, a calculation unit calculates an indicator value indicative of a likelihood that the first and second other vehicles are the same, where the indicator value is defined as a function of the speed of the first other vehicle detected by the detection unit and the speed of the second other vehicle indicated by the information received by the communication unit. A determination unit determines whether or not the first and second other vehicles are the same on the basis of the indicator value calculated by the calculation unit.

7 Claims, 18 Drawing Sheets

VEHICLE IDENTIFICATION APPARATUS AND METHOD

CROSS-REFERENCE TO RELATED APPLICATION

This application is based on and claims the benefit of priority from earlier Japanese Patent Applications No. 2013-93818 filed Apr. 26, 2013, the descriptions of which are incorporated herein by reference.

BACKGROUND

1. Technical Field

The present invention relates to techniques for detecting a travel condition of a vehicle other than the subject vehicle.

2. Related Art

Techniques are known for acquiring position information of a vehicle other than the subject vehicle through vehicle-to-vehicle communication and utilizing the position information of the other vehicle to detect a relative position of the other vehicle relative to the subject vehicle. As an example, the technique as disclosed in Japanese Patent Application Laid-Open Publication No. 2007-280060 evaluates a degree of matching between a radar vector representing the amount and direction of the other vehicle detected by the radar and a GPS vector representing the amount and direction of the other vehicle determined based on of the position information of the other vehicle received through the vehicle-to-vehicle communication. When the degree of matching is equal to or greater than a threshold, it is determined that the vehicle having the radar vector is a vehicle with which the subject vehicle is communicating.

However, great errors may be present in the GPS location information, which can lead to great errors in the amount and direction of movement determined on the basis of the location information. Therefore, for example, in situations such that a plurality of vehicles other than the subject vehicle are traveling in the same direction in proximity to each other, it is difficult to determine associations between the plurality of other vehicles detected by the detector (e.g., the radar or the like) mounted in the subject vehicle and the plurality of other vehicles with which the subject vehicle is communicating in vehicle-to-vehicle communication.

In consideration of the foregoing, it would therefore be desirable to have techniques for accurately determining an association between a vehicle detected by a detector mounted in the subject vehicle and a vehicle with which the subject vehicle is communicating in vehicle-to-vehicle communication.

SUMMARY

In accordance with an exemplary embodiment of the present invention, there is provided a vehicle identification apparatus mounted in a vehicle provided with a detection unit configured to detect a speed of a first other vehicle and a communication unit configured to receive information indicative of a speed of a second other vehicle from the second other vehicle.

In the apparatus, a calculation unit calculates an indicator value indicative of a likelihood that the first and second other vehicles are the same, where the indicator value is defined as a function of the speed of the first other vehicle detected by the detection unit and the speed of the second other vehicle indicated by the information received by the communication unit. A determination unit determines whether or not the first and second other vehicles are the same on the basis of the indicator value calculated by the calculation unit.

With this configuration, even in situations such that a plurality of vehicles other than the subject vehicle are traveling in the same direction in proximity to each other, it can be determined more accurately whether or not the detection vehicle and the communication vehicle are the same, as compared to when determined only based on the GPS location information.

Depending on certain implementation requirements of the inventive methods, the inventive methods can be implemented in hardware or in software. The implementation can be performed using a digital storage media, in particular a disc, a DVD, a flash memory or a CD having electronically readable control signals stored thereon, which cooperate with a programmable computer system such that the inventive methods are performed. Generally, the present invention is therefore a machine readable carrier with program code being operative for performing the inventive methods when the computer program product runs on a computer or processor. In other words, the inventive methods are, therefore, a computer program having program code for performing at least one of the inventive methods when the computer program runs on a computer or processor.

DESCRIPTION OF SPECIFIC EMBODIMENTS

Figures 1A, 1B:
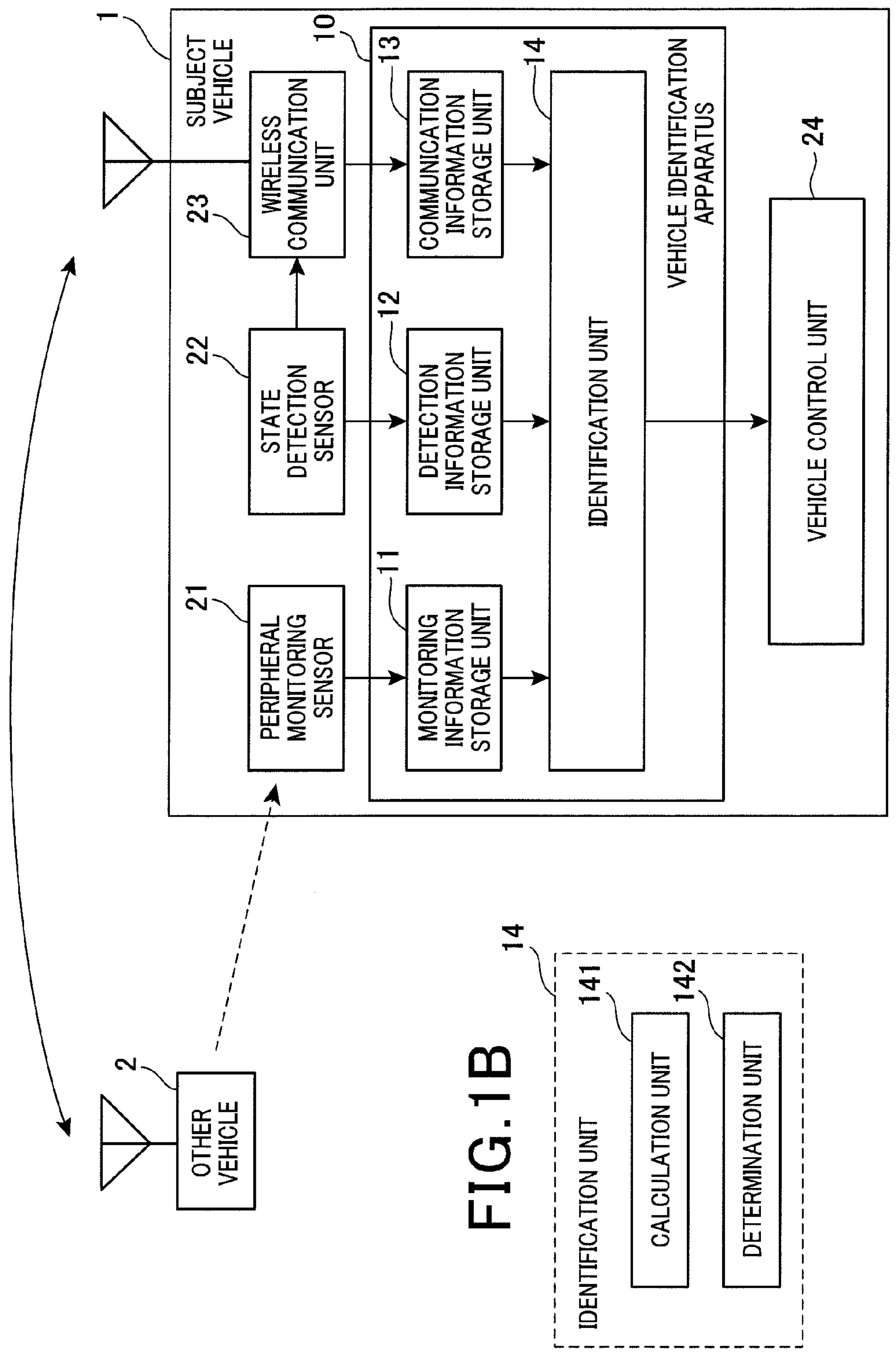
FIG. 1A schematically shows a block diagram of a vehicle identification apparatus in accordance with a first embodiment of the present invention.
FIG. 1B schematically shows a block diagram of an identification unit shown in FIG. 1A.

The present inventions will be described more fully hereinafter with reference to the accompanying drawings. Like numbers refer to like elements throughout.

1. First Embodiment

1-1. Configuration

A vehicle identification apparatus 10 shown in FIG. 1 is mounted in a vehicle (as a subject vehicle) 1 including a peripheral monitoring sensor 21 (as a detection unit), a state detection sensor 22, a wireless communication unit 23 (as a communication unit), and a vehicle control unit 24. In the present embodiment, it may be assumed that vehicles 2 other than the subject vehicle 1, which are present around the subject vehicle 1, are each provided with the configuration similar to that of the subject vehicle 1.

The peripheral monitoring sensor 21 detects a speed and a position and the like of an object present around the subject vehicle 1 relative to the subject vehicle 1. In the present embodiment, a millimeter-wave radar is employed as the peripheral monitoring sensor 21 to detect, as an object, the vehicle 2 present in front of the subject vehicle 1 (see FIG. 2). Alternatively or additionally to the millimeter-wave radar, another device that can function similar thereto, such as a laser radar or a camera, may be used.

The state detection sensor 22 detects a speed, an absolute position, acceleration, braking, a steering angle and others of the subject vehicle 1. In the present embodiment, a speed sensor, a GPS receiver, an accelerator pedal sensor, a brake pedal sensor and a steering angle sensor may be used together as the state detection sensor 22.

The wireless communication unit 23 transmits information indicative of a vehicle number (vehicle's unique identification information), a speed, an absolute position, acceleration, braking, a steering angle and others of the subject vehicle 1 to the other vehicle 2 present around the subject vehicle 1 (in the present embodiment, within a coverage centered at the subject vehicle 1).

The wireless communication unit 23 receives, from the other vehicle 2 present around the subject vehicle 1, information indicative of a vehicle number (vehicle's unique identification information), a speed, an absolute position, acceleration, braking, a steering angle and others of the other vehicle 2, for example, through vehicle-to-vehicle communication, vehicle-roadside communication, cellular communication, visible light communication and the like.

The vehicle identification apparatus 10 includes a monitoring information storage unit 11, a detection information storage unit 12, a communication information storage unit 13, and an identification unit 14. The monitoring information storage unit 11 stores information received from the peripheral monitoring sensor 21 and manages the information in chronological order. More specifically, the monitoring information storage unit 11 acquires, from the peripheral monitoring sensor 21 every predetermined time interval, object numbers (identification information assigned to the respective detected objects), information indicative of a relative speed and a relative position of each detected object, and information indicative of the presence of a lost object. The monitoring information storage unit 11 stores, for each object number, the information (indicative of the relative speed and the relative position of the other vehicle 2) acquired in the last T cycles including the (T−1)-th previous cycle, the (T−2)-th previous cycle, . . . , the current cycle, where T is a positive integer. As described later, the value T is not a fixed value, but a value variably set as a function of a detection condition of the objects. More specifically, as long as each of the detected objects (the other vehicles 2) continues to be detected by the peripheral monitoring sensor 21, the information associated therewith is stored every predetermined time interval. Once at least one object is lost, the stored information will be discarded.

The detection information storage unit 12 stores information received from the state detection sensor 22 and manages the information in chronological order. More specifically, the communication information storage unit 12 acquires, from the state detection sensor 22 every predetermined time interval, information indicative of a speed, an absolute position, acceleration, braking, a steering angle and others of the subject vehicle 1. The detection information storage unit 12 stores the information (indicative of the speed and the absolute position of the subject vehicle 1) acquired in the last T cycles as above.

The communication information storage unit 13 stores information received from the wireless communication unit 23 and manages the information in chronological order. More specifically, the communication information storage unit 13 acquires, from the wireless communication unit 23 every predetermined time interval, information indicative of a vehicle number, a speed, an absolute position, acceleration, braking, a steering angle and others of each other vehicle 2. The communication information storage 13 stores, for each vehicle number, the information (indicative of the speed and the absolute position of the other vehicle 2) acquired in the last T cycles as above.

The identification unit 14 determines whether or not the other vehicle 2 having a speed and others detected by the peripheral monitoring sensor 21 (hereinafter referred to as a detection vehicle or a detected vehicle) is the same as the other vehicle 2 that is the source of the information received by the wireless communication unit 23 (hereinafter referred to as a communication vehicle or a communicating vehicle).

As shown in FIG. 1B, the identification unit 14 includes a calculation unit 141 configured to calculate an indicator value as described later and a determination unit 142 configured to determine whether or not the detection vehicle (as a first other vehicle) and the communication vehicle (as a second other vehicle) are the same on the basis of the indicator value calculated by the calculation unit 141.

Figure 3:
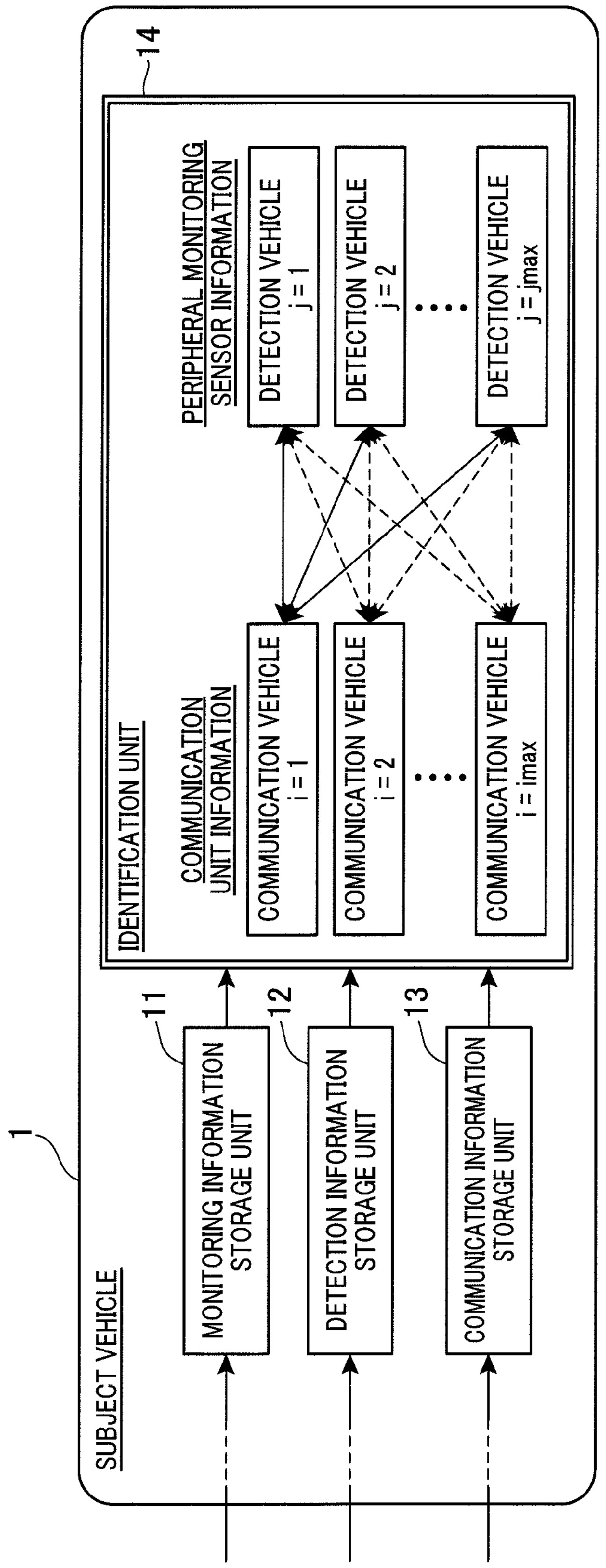
FIG. 3 shows an example of determining that a communication vehicle and a detection vehicle are the same.

More specifically, as shown in FIG. 3, the identification unit 14 calculates, for each pair of communication and detection vehicles currently detected, an indicator value indicative of a likelihood that the communication vehicle and the detection vehicle of the pair are the same vehicle (or a degree of matching between the communication vehicle and the detection vehicle). The identification unit 14 determines the pairs of communication and detection vehicles identified as the same vehicle on the basis of the calculated indicator values. For each pair of imax×jmax possible pairs of communication and detection vehicles, it is determined whether or not the communication and detection vehicles of the pair are the same, where imax is a maximum vehicle number (i.e., 1≤vehicle number i≤imax) and jmax is a maximum object number (i.e., 1≤object number j≤jmax).

Figure 2:
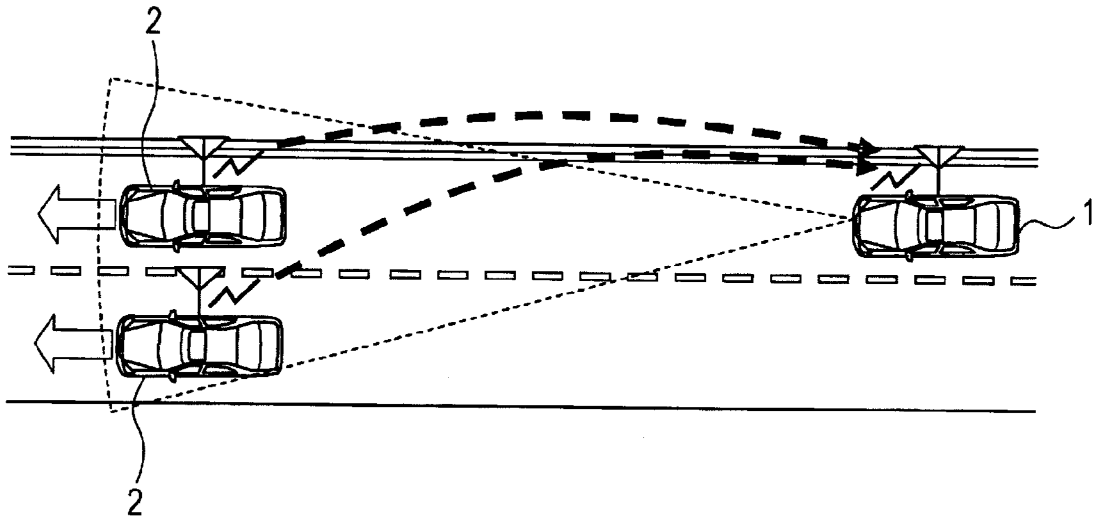
FIG. 2 shows an example of positional relationship between the subject vehicle and other vehicles.

For example, as shown in FIG. 2, when two other vehicles 2 are traveling in front of the subject vehicle 1 and within a detectable range of the peripheral monitoring sensor 21, the number of detection vehicles jmax is two. When only these two other vehicles 2 are within the coverage centered at the subject vehicle 1, the number of the communication vehicles imax is also two. This scenario leads to four pairs of communication and detection vehicles for which the vehicle identity has to be determined. In practice, the vehicle identity doesn't have to be determined for all these four pairs of communication and detection vehicles. As described later, once a certain pair of communication and detection vehicles that can be identified as the same is found in the course of determining vehicle identity for the respective pairs in order, the vehicle identification may be skipped for the remaining pairs of communication and detection vehicles.

The vehicle control unit 24 performs a vehicle control process for implementing a Cooperative Adaptive Cruise Control (CACC) function, that is, a function to acquire information indicative of acceleration, braking, a steering angle and others of the other vehicle 2 (also referred to as a preceding vehicle) traveling in the lane of the subject vehicle 1 and in front of the subject vehicle 1 and use the acquired information to automatically accelerate or decelerate the subject vehicle 1. Alternatively, such a vehicle control process for implementing the CACC function may be replaced with another vehicle control process.

The identification unit 14 and the vehicle control unit 24 are embodied by their respective microcomputers including a central processing unit (CPU), a read-only memory (ROM), a random access memory (RAM) and others. That is, each microcomputer may function as the identification unit 14 or the vehicle control unit 24 by executing a computer program stored in the ROM or the like. Alternatively, a common microcomputer may function as the identification unit 14 and the vehicle control unit 24.

1-2. Identification Process

An identification process performed in the identification unit 14 will now be explained with reference to a flowchart of FIG. 4. The identification process may be repeated every predetermined time interval.

First, in step S101 the value of a variable i is set to 1 and the value of a variable j is set to 1. The variable i represents a vehicle number assigned to a communication vehicle to be processed and takes a positive integer equal to or greater than 1 and equal to or less than a maximum number imax, the total number of communication vehicles (i.e., $1 \le i \le imax$). The variable j represents an object number assigned to a detection vehicle to be processed and takes a positive integer equal to or greater than 1 and equal to or less than a maximum number jmax, the total number of detection vehicles (i.e., $1 \le j \le jmax$).

Subsequently, a matching degree calculation process is performed in step S102 (described later in more detail) to calculate a variance V as an indicator value indicative of a likelihood that the communication vehicle having the vehicle number i (referred to as a communication vehicle i) and the detection vehicle having the object number j (referred to as a detection vehicle j) are the same. The variance V is calculated on the basis of a speed of the communication vehicle i indicated by the information received by the wireless communication unit 23 and a speed of the detection vehicle j detected by the peripheral monitoring sensor 21. As described above, in the present embodiment, the calculated variance V decreases with an increasing likelihood that the communication vehicle i and the detection vehicle j are the same.

Subsequently, in step S103, it is determined whether or not the variance V calculated in step S102 is less than a threshold V1 (as a third predetermined threshold). The threshold V1 is a criterion value, on the basis of which it is determined whether or not the communication vehicle i and the detection vehicle j are the same. In the present embodiment, when the variance V is less than the threshold V1, the communication vehicle i and the detection vehicle j are the same.

If it is determined in step S103 that the variance V is equal to or greater than the threshold V1, then in step S104 it is determined whether or not the value of the variable j is equal to or greater than the maximum number jmax. The maximum number jmax refers to the total number of detection vehicles, information on which is stored in the monitoring information storage unit 11. That is, in step S104, it is determined whether or not the operations in steps S102 and S103 have been performed for all the detection vehicles j (j=1, . . . , jmax).

If it is determined in step S104 that the value of the variable j is less than the maximum number jmax, then in step S105 the value of the variable j is incremented by one. Thereafter the process returns to step S102 where the matching degree calculation process is repeated for another detection vehicle.

Meanwhile, if it is determined in step S103 that the variance V is less than the threshold V1, then in step S106 it is determined that the communicating vehicle i and the detection vehicle j are the same. Thereafter, the process proceeds to step S107. Also, if it is determined in step S104 that the value of the variable j is equal to or greater than the maximum number jmax, then the process proceeds to step S107.

It is determined in step S107 whether or not the value of the variable i is equal to or greater than the maximum number imax. The maximum number imax refers to the total number of communication vehicles, information on which is stored in the communication information storage unit 13. That is, in step S107, it is determined whether or not the operations in steps S102 to S106 have been performed for all the communication vehicles i (i=1, . . . , imax).

If it is determined in step S107 that the value of the variable i is less than the maximum number imax, then in step S108 the value of the variable i is incremented by one and then the value of the variable i is reset to 1 in step S109. Thereafter the process returns to step S102 where the matching degree calculation process is repeated for another communication vehicle. Meanwhile, if it is determined in step S107 that the value of the variable i is equal to or greater than the maximum number imax, then the identification process ends.

Figure 4:
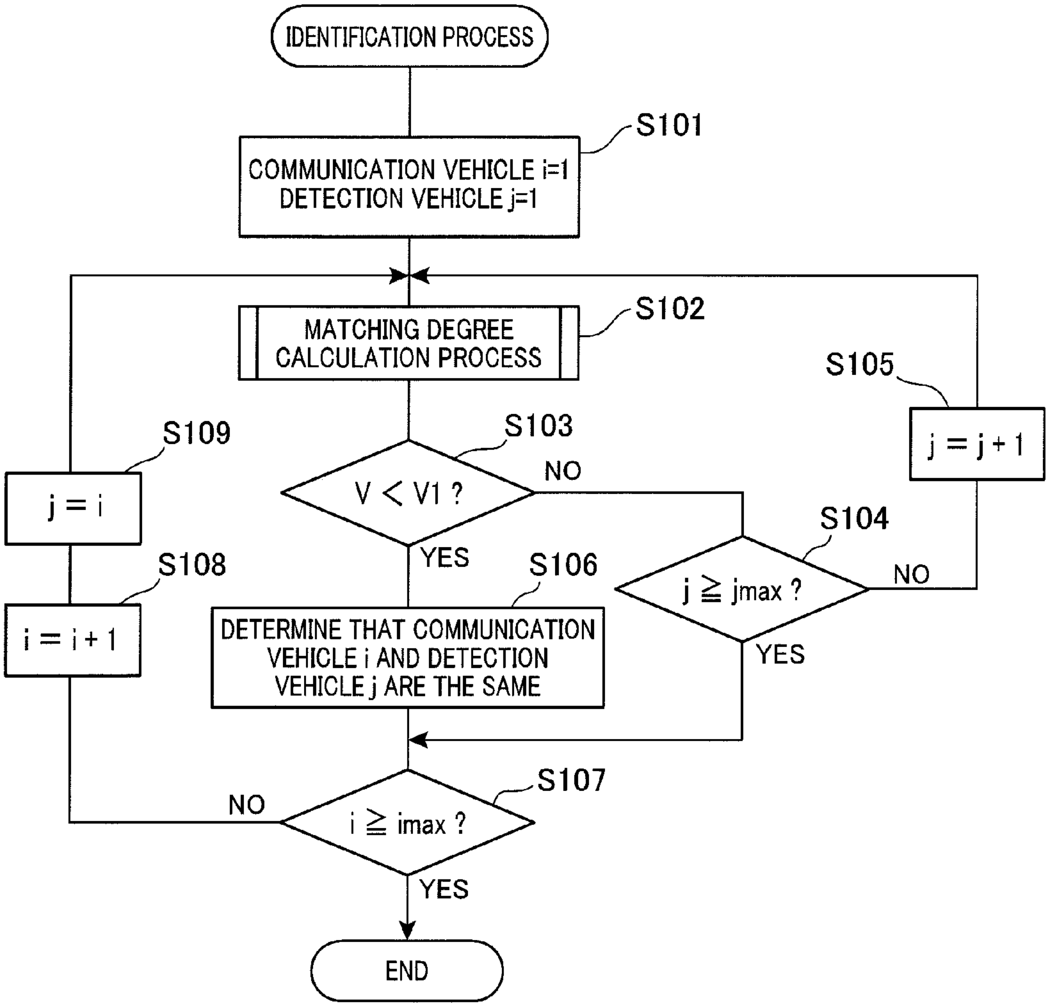
FIG. 4 shows a flowchart of an identification process in accordance with the first embodiment.

Again, the identification process of FIG. 4 is performed in the identification unit 14. In the identification unit 14, the calculation unit 141 is mainly responsible for executing the matching degree calculation process in step S102 and the determination unit 142 is mainly responsible for executing the determination process in step S103.

The matching degree calculation process performed in step S102 of the identification process (see the flowchart of FIG. 4) will now be explained in more detail. In the matching degree calculation process, the variances V are calculated on the basis of speeds of the detection vehicles detected by the peripheral monitoring sensor 21 relative to the subject vehicle 1 and speeds of the communication vehicles indicated by the information received by the wireless communication unit 23. More specifically, the variances V are calculated on the basis of changes over time of speeds of the detection vehicles and changes over time of speeds of the communication vehicles.

Figure 5:
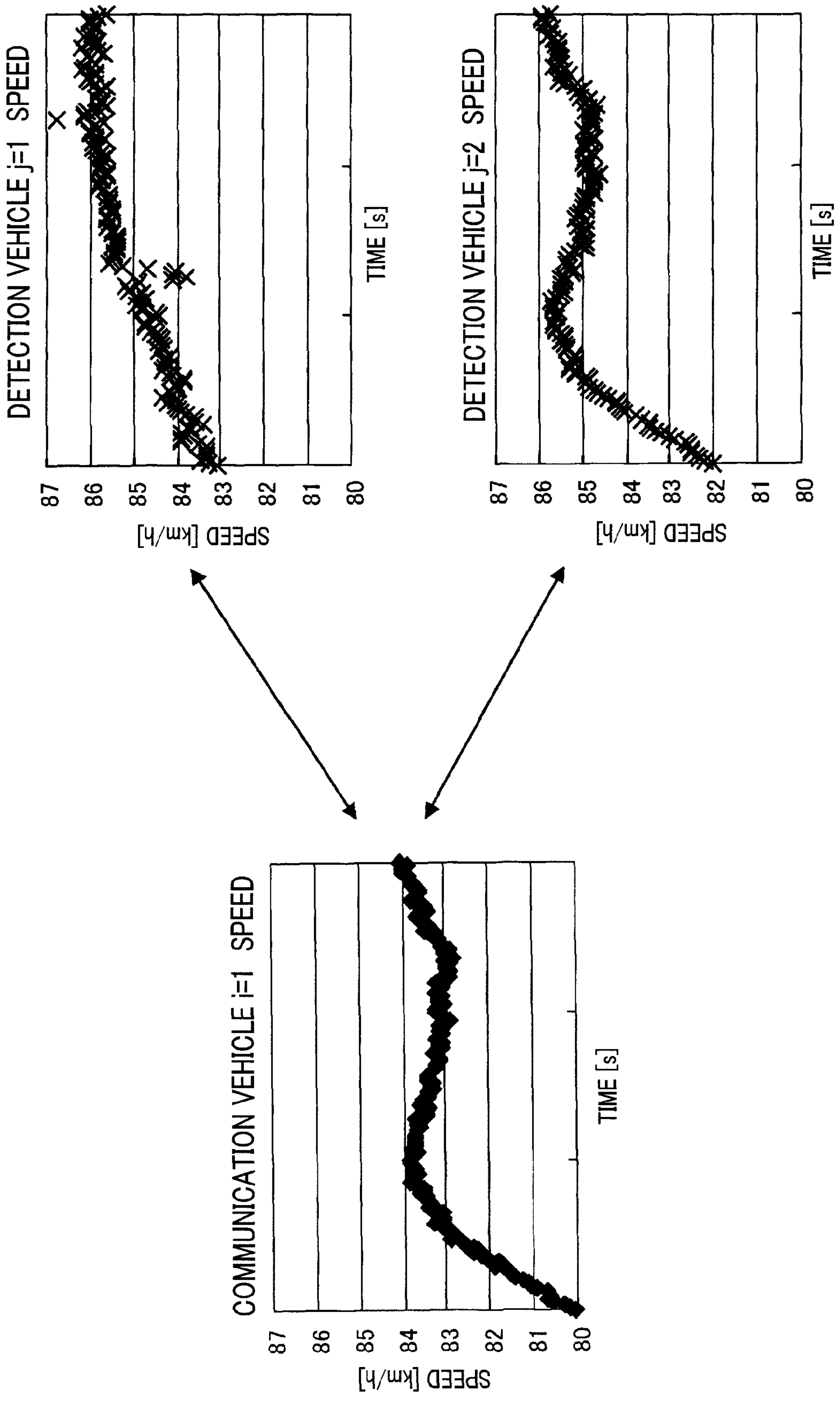
FIG. 5 shows an example of a change over time of vehicle speed for each of communication and detection vehicles.

For example, it may be supposed that two other vehicles 2 are traveling alongside each other as shown in FIG. 2. In such a scenario, even though drivers of the two other vehicles 2 try to keep their respective vehicle speeds as constant as possible, a difference between their respective small vehicle speed behaviors (changes over time of the speeds of the respective other vehicles 2) may occur. As shown in FIG. 5, use of the peripheral monitoring sensor 21 and the state detection sensor 22 allows their respective small vehicle speed behaviours to be detected. Hence, correlating the change over time of the speed of each detection vehicle with the change over time of the speed of each communication vehicle allows the variance V to be calculated as a function of the difference in vehicle speed behaviour during a certain time period.

More specifically, the variance V may be calculated according to the following procedure.

1. Conversion from Relative Speed to Absolute Speed

As shown in Eq. (1), an absolute speed of the detection vehicle j is calculated by adding the relative speed of the detection vehicle j to the speed (absolute speed) of the subject vehicle 1. In Eq. (1), Vjmr(t) is the relative speed of the detection vehicle j at time t, Vo(t) is the speed of the subject vehicle 1 at time t, and Vjm(t) is the absolute speed of the detection vehicle j at time t.

$$V^j_m(t)=V^j_{mr}(t)+V_o(t) \tag{1}$$

2. Calculation of Speed Ratio

As shown in Eq. (2), a speed ratio R is calculated, which is a ratio of the speed (absolute speed) of the communication vehicle i to the speed (absolute speed) of the detection vehicle j. In Eq. (2), Vic(t) is the speed of the communication vehicle i at time t and Rj(t) is the ratio of the speed of the communication vehicle i to the speed of the detection vehicle j at time t, $$R^j(t) = \frac{V_c^i(t)}{V_m^j(t)} \tag{2}$$

3. Calculation of Variance of Speed Ratio R

Figure 6:
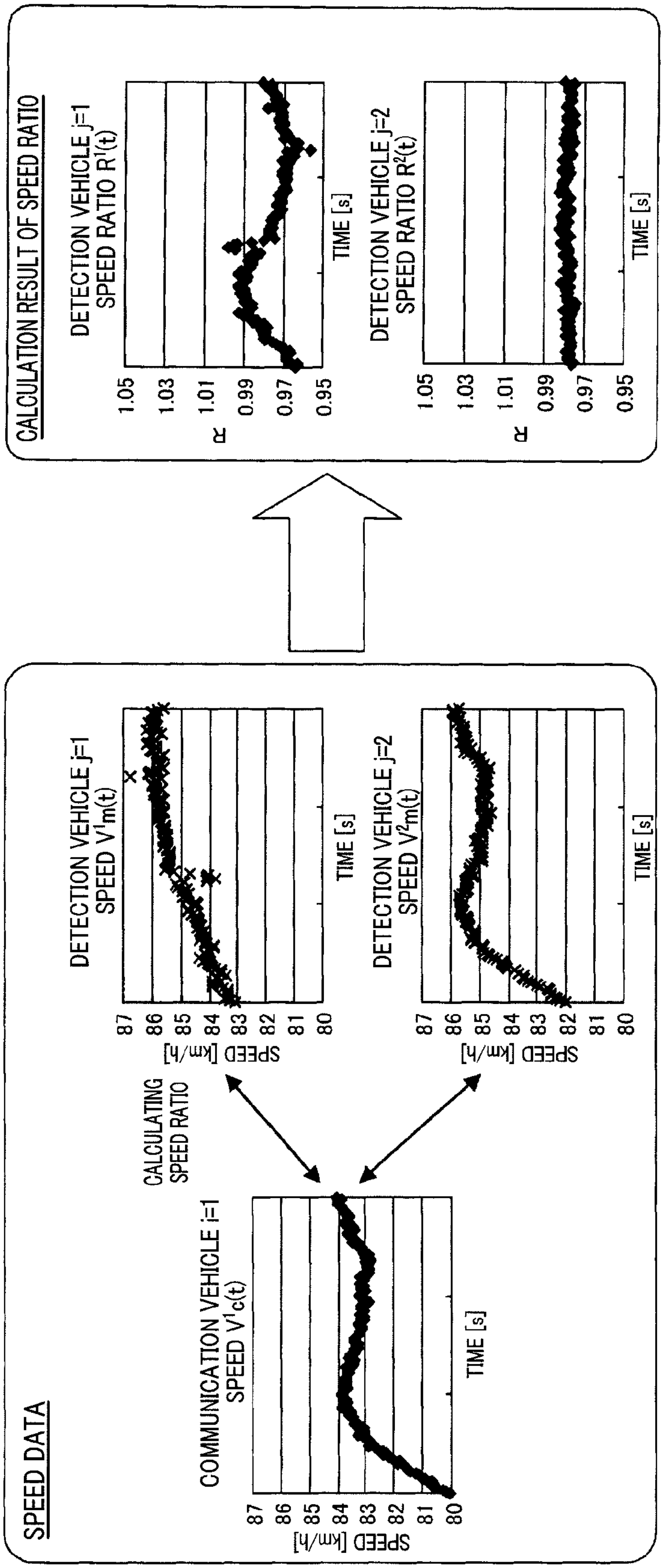
FIG. 6 shows an example of calculating a speed ratio.

FIG. 6 shows the speed ratio R1(*t*) of the speed of the communication vehicle i=1 to the speed of the detection vehicle j=1 that is different from the communication vehicle i=1 and the speed ratio R2(*t*) of the speed of the communication vehicle i=1 to the speed of the detection vehicle j=2 that is the same as the communication vehicle i=1. The speed ratio R is substantially constant over time when the communication vehicle and the detection vehicle are the same. That is, the variation in speed ratio R decreases with an increasing likelihood that the communication vehicle and the detection vehicle are the same.

It should be noted that in FIG. 6 the speed ratio R2(*t*) of the speed of the communication vehicle i=1 to the speed of the detection vehicle j=2 is a substantially constant value different from 1, which is caused by a deviation of the speed detected by the speed sensor from the actual speed. That is, when the communication vehicle and the detection vehicle are the same, the speed ratio R is substantially constant even in the presence of a deviation of the detected speed from the actual speed. The deviation of the detected speed from the actual speed may be caused by a change in outer diameter of a tire due to tire wear.

Figure 7:
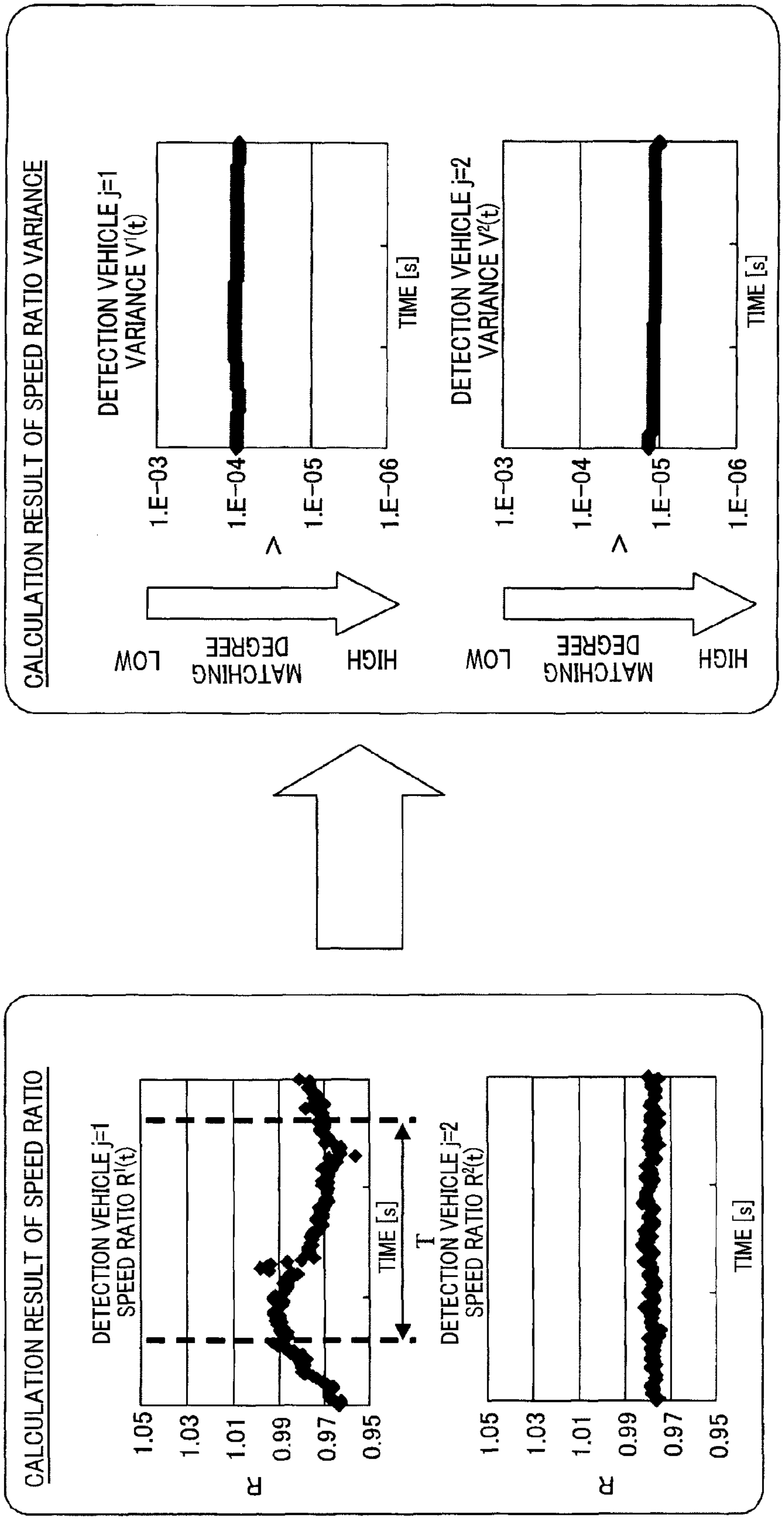
FIG. 7 shows an example of calculating a variance.

In the present embodiment, as shown in FIG. 7, the variance V of the speed ratio R over a calculation period T (a variation in speed ratio of the speed of the communication vehicle to the speed of the detection vehicle) is calculated. The calculation period T is a time period corresponding to the information acquired in the last T cycles (including the current cycle). The variance V of the speed ratio R over the calculation period T is a variance calculated by using the information acquired in the last T cycles (including the (T−1)-th previous cycle, (T−2)-th previous cycle, . . . , the current cycle), which is expressed by Eq. (3). A process of setting the calculation period T will be explained later. In Eq. (3), RjA is an average of the speed ratio Rj(t) over the calculation period T.

$$V^j(t) = \frac{1}{T}\sum_{n=0}^{T-1} \{R^j(t-n) - R_A^j\}^2 \tag{3}$$

Figure 8:
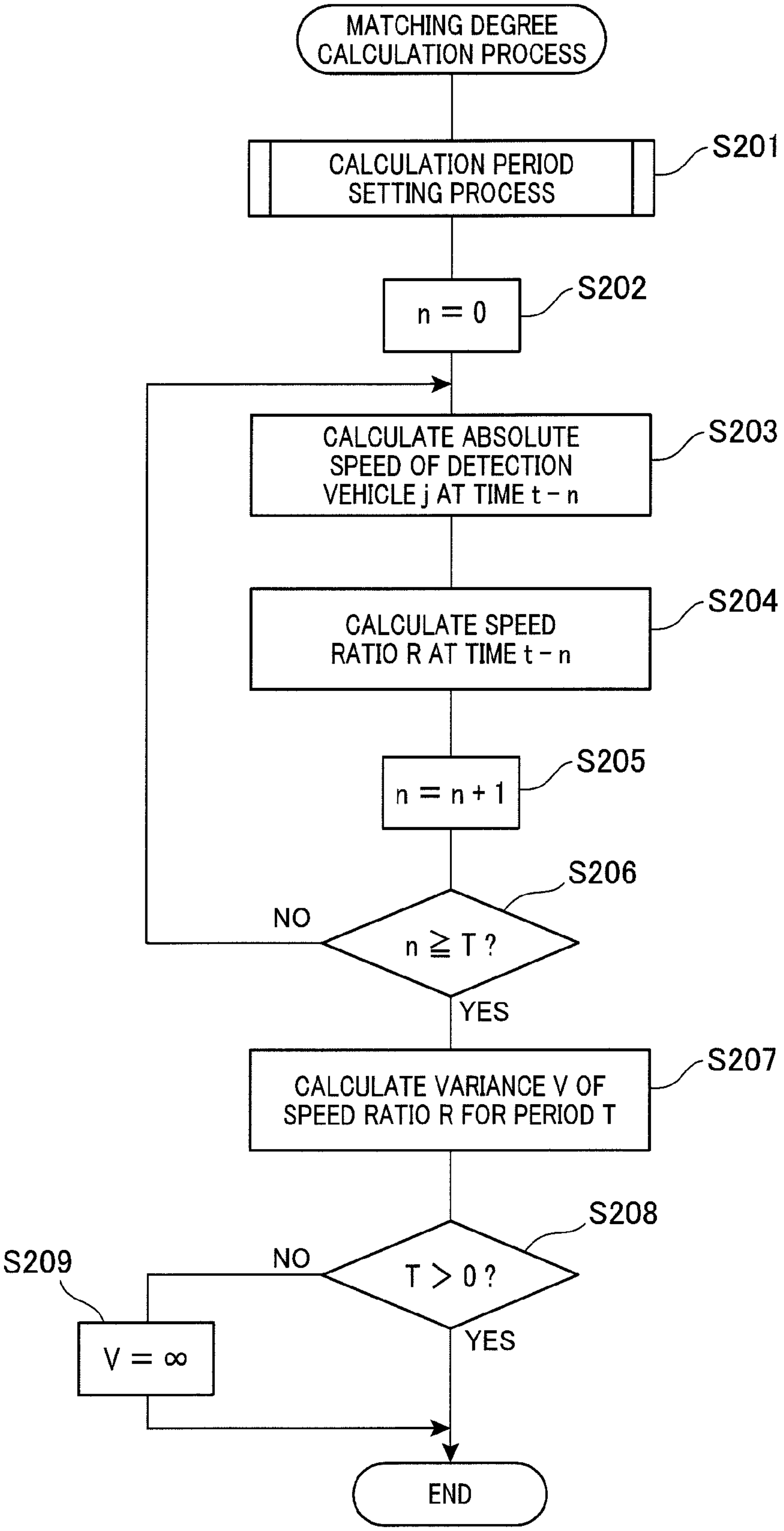
FIG. 8 shows a flowchart of a matching degree calculation process in accordance with the first embodiment.

The matching degree calculation process set forth above, that is, the process of calculating the variance V at time t, will be explained in more detail with reference to a flowchart of FIG. 8. The matching degree calculation process is performed in the identification unit 14.

First, in step S201, a calculation period setting process is performed, where the calculation period T used to calculate the variance V is set. The calculation period setting process will be explained later in more detail.

Subsequently, in step S202, the value of a variable n is set to 0. Thereafter, in step S203, the absolute speed of the detection vehicle at time t−n (at the time of the nth previous cycle) is calculated according to the following Eq. (4).

$$V^j_m(t-n)=V^j_{mr}(t-n)+V_o(t-n) \tag{4}$$

Subsequently, in step S205, the speed ratio R at time t−n is calculated according to the Eq. (5).

$$R^j(t-n)=V^i_c(t-n)/V^j_m(t-n) \tag{5}$$

Subsequently, the value of the variable n is incremented by one in step S205 and it is determined in step S206 whether or not the value of the variable n is equal to or greater than the value of the calculation period T. That is, in step S206, for all the information stored, in the last T cycles, in the monitoring information storage unit 11, the detection information storage unit 12 and the communication information storage unit 13, it is determined whether or not the operations in steps S203 and S204 have been performed. If it is determined in step S206 that the value of the variable n is less than the value of the calculation period T, then the process returns to step S203.

If it is determined in step S206 that the value of the variable n is equal to or greater than the value of the calculation period T, then in step S207 the variance V of the speed ratio R is calculated according to the Eq. (3).

Subsequently, in step S208, it is determined whether or not the value of the calculation period T is greater than 0. If it is determined in step S208 that the value of the calculation period T is greater than 0, then the matching degree calculation process of FIG. 8 ends. If it is determined in step S208 that the value of the calculation period T is equal to or less than 0, then the value of the variance V is set to infinity and the matching degree calculation process of FIG. 8 ends. The infinite value of the variance V leads to the minimum likelihood (i.e., of 0) that the detection vehicle and the communication vehicle are the same. The value of the calculation period T equal to or less than 0 means that the value of the calculation period T is set at 0 in the operation of step S305 described later in detail.

Alternatively, the operations of steps S208 to S209 may be performed in advance, for example, immediately after the operation of step S201. Then, if the value of the calculation period T is equal to or less than 0, the operations of steps S202 to S207 may be skipped.

The calculation period setting process performed in step 201 of the matching degree calculation process (see FIG. 8) will now be explained in more detail. In the calculation period setting process, the calculation period T is set in the following manner.

(i) The value of the calculation period T is a duration in which the detection vehicle j is detected continuously without being lost.

(ii) When the detection vehicle j becomes lost due to detection conditions or the like, a lost vehicle flag indicating that the detection vehicle j is lost is acquired from the peripheral monitoring sensor 21. At the same time the calculation period T is reset. The lost vehicle flag indicating that the detection vehicle j is lost may be transmitted from the peripheral monitoring sensor 21 not only when the detection vehicle j is lost for ever, but also not only when the detection vehicle is lost temporarily.

(iii) The calculation period T is used to calculate the variance V, provided that the value of the calculation period T is greater than a predetermined threshold (as a first predetermined threshold). The predetermined threshold is set so as to prevent false determinations (that the communication vehicle and the detection vehicle are the same) from occurring due to the calculated variance V.

The calculation period setting process as above will now be explained in more detail with reference to a flowchart of FIG. 9. The calculation period setting process is performed in the identification unit 14 and used to set the calculation period T to calculate the variance V for the detection vehicle j.

First, in step S301, it is determined whether or not the lost vehicle flag L(t) indicative of the detection vehicle j being lost at time t is detected. More specifically, the lost vehicle flag L(t) with a value of 1, i.e., L(t)=1, indicates that the detection vehicle j is lost at time t and the lost vehicle flag L with a value of 0, i.e., L(t)=0, indicates that the detection vehicle j is not lost at time t.

If it is determined in step S301 that the lost vehicle flag L(t) with a value of 1 (L(t)=1) indicating that the detection vehicle j is lost at time t is detected, then in step S302 a last lost vehicle detection time Ltime is updated to time t and the process proceeds to step S303. Meanwhile, if it is determined in step S301 that the lost vehicle flag L(t) with a value of 1 is not detected, then the process skips step S302 and proceeds to step S303.

In step S303, the calculation period T is calculated by subtracting the last lost vehicle detection time Ltime from the present time t. That is, the calculation period T for calculating the variance V for the detection vehicle j is a duration in which the detection vehicle j is detected continuously without being lost. T−Ltime is calculated in units of the predetermined time interval. For example, when the lost vehicle flag L(t) with a value of 1 (L(t)=1) is detected in the first previous cycle, T=t−Ltime=1. When the lost vehicle flag L(t) with a value of 1 (L(t)=1) is detected in the second previous cycle, T=t−Ltime=2.

Subsequently, in step S304, it is determined whether or not the calculation period T calculated in step S303 is greater than a predefined threshold (a minimum set value of the calculation period T as the first predetermined threshold) Tmin. If it is determined in step S304 that the calculation period T is greater than the predefined threshold Tmin, then the calculation period setting process of FIG. 9 ends.

Figure 9:
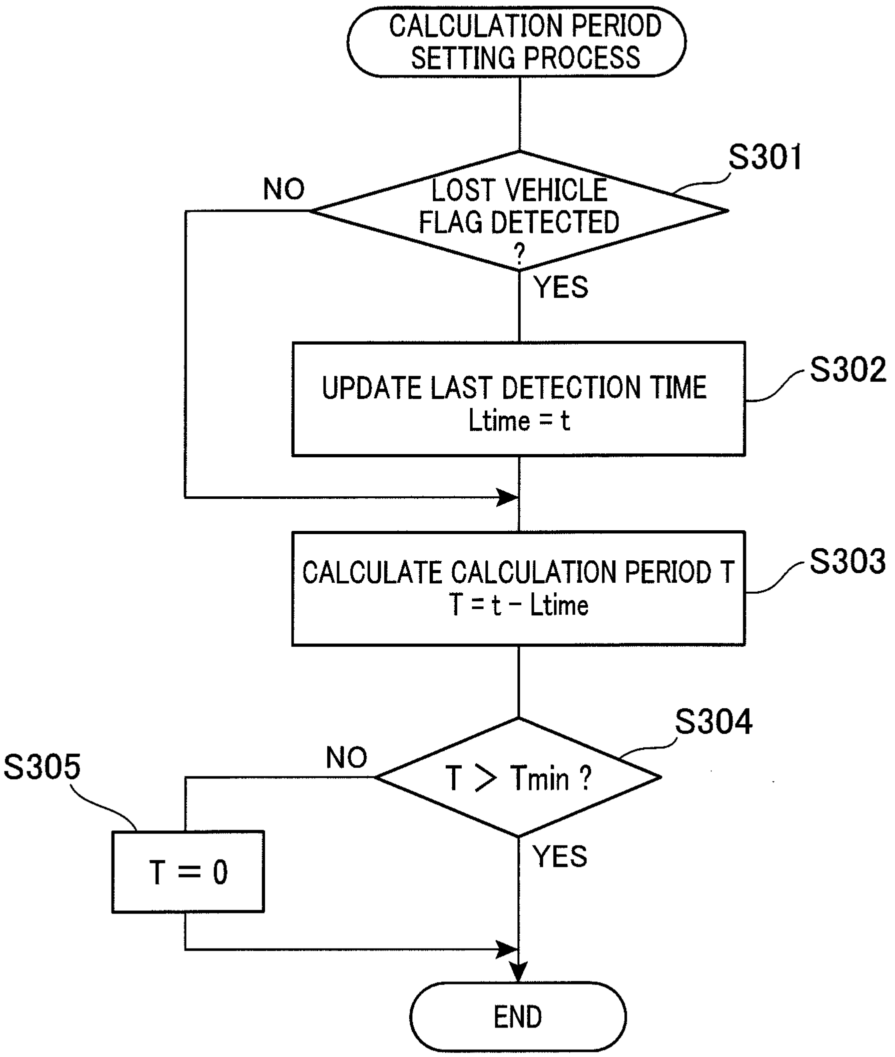
FIG. 9 shows a flowchart of a calculation period setting process in accordance with the first embodiment.

Meanwhile, if it is determined in step S304 that the calculation period T is equal to or less than the predefined threshold Tmin, then the value of the calculation period T is set to 0 and the calculation period setting process of FIG. 9 ends. Such setting the value of the calculation period T to 0 leads to the value of the variance V set to infinity in steps S208 to S209 of the matching degree calculation process (see FIG. 8), which thus leads to the determination that the communication vehicle and the detection vehicle are not the same. That is, in the matching degree calculation process, given the value of the calculation period T greater than the threshold Tmin, a change over time of the speed of the detection vehicle is correlated with a change over time of the speed of the communication vehicle during the calculation period T, which allows the variance V to be calculated as a function of difference in speed behavior therebetween. More specifically, when the value of the calculation period T is equal to or less than the threshold Tmin, as compared to when the value of the calculation period T is greater than the threshold Tmin, the variance V is set to a value leading to a low likelihood that the detection vehicle and the communication vehicle are the same (in the present embodiment, infinity).

1-3. Benefits

The present embodiment set forth above can provide the following benefits.

[1A] The matching degree calculation process is performed (in step S102), where the variance V is calculated that is an indicator value of a likelihood that the detection vehicle and the communication vehicle are the same. On the basis of the calculated variance V, it is determined (in step S103) whether or not the detection vehicle and the communication vehicle are the same. More specifically, in the matching degree calculation process (in step S102), the variance V is calculated on the basis of the speed of the detection vehicle detected by the peripheral monitoring sensor 21 and the speed of the communication vehicle indicated by the information received by the wireless communication unit 23 (in steps S202 to S207). With the vehicle identification apparatus 10 in accordance with the first embodiment, even in situations such that a plurality of vehicles other than the subject vehicle are traveling in the same direction in proximity to each other, it can be determined more accurately whether or not the detection vehicle and the communication vehicle are the same, as compared to when determined only on the GPS location information.

[1B] In the matching degree calculation process, the variance V is calculated on the basis of the change over time of the speed of the detection vehicle and the change over time of the speed of the communication vehicle (in steps S202 to S207). Hence, with the vehicle identification apparatus 10 in accordance with the first embodiment, it can be determined accurately whether or not the detection vehicle and the communication vehicle are the same.

[1C] In the matching degree calculation process, the variance V is calculated by correlating the change over time of the speed of the detection vehicle with the change over time of the speed of the communication vehicle during the calculation period T in which the variance V is calculated (in steps S202 to S207). Hence, with the vehicle identification apparatus 10 in accordance with the first embodiment, it can be determined accurately whether or not the detection vehicle and the communication vehicle are the same.

[1D] In the matching degree calculation process, the variance V is calculated on the basis of the variation in speed ratio of the speed of the communication vehicle to the speed of the detection vehicle over the calculation period T (in steps S202 to S207). Hence, with the vehicle identification apparatus 10 in accordance with the first embodiment, it is relatively easy to determine a degree of correlation between the change over time of the speed of the detection vehicle and the change over time of the speed of the communication vehicle. In addition, even in the presence of a deviation of the detected speed from the actual speed, relatively accurate determination results can be obtained.

[1E] In the matching degree calculation process, the calculation period T in which the variance V for the detection vehicle and the communication vehicle is calculated is set according to detection conditions of the detection vehicle (in step S201). Hence, with the vehicle identification apparatus 10 in accordance with the first embodiment, the accuracy of determining whether or not the detection vehicle and the communication vehicle are the same can be enhanced as compared to when configured such that the calculation period T is set regardless of the detection conditions of the detection vehicle.

[1F] In the matching degree calculation process, the calculation period T for calculating the variance V for the detection vehicle and the communication vehicle is set to a duration in which the detection vehicle is continuously detected by the peripheral monitoring sensor 21 without being lost (in steps S301 to S303). Hence, with the vehicle identification apparatus 10 in accordance with the first embodiment, the accuracy of determining whether or not the detection vehicle and the communication vehicle are the same can be enhanced as compared to when configured such that the calculation period T may be set to include a time period in which the detection vehicle is lost.

[1G] In the matching degree calculation process, the calculation period T for calculating the variance V for the detection vehicle and the communication vehicle is set to a duration in which the detection vehicle is continuously detected by the peripheral monitoring sensor 21 without being lost (in steps S301 to S303). Hence, with the vehicle identification apparatus 10 in accordance with the first embodiment, the accuracy of determining whether or not the detection vehicle and the communication vehicle are the same can be enhanced as compared to when configured such that the calculation period T is set to a portion of the duration in which the detection vehicle is continuously detected by the peripheral monitoring sensor 21 without being lost.

[1H] In the matching degree calculation process, given the calculation period T greater than the threshold Tmin (in step S304), the variance V is calculated by correlating the change over time of the speed of the detection vehicle with the change over time of the speed of the communication vehicle during the calculation period T (in step S208). Hence, with the vehicle identification apparatus 10 in accordance with the first embodiment, the accuracy of determining whether or not the detection vehicle and the communication vehicle are the same can be enhanced as compared to when configured such that the calculation period T may be set less than the threshold Tmin.

[1I] In the matching degree calculation process, when the calculation period T is equal to or less than the threshold Tmin (in step S304), as compared to when the calculation period T is greater than the threshold Tmin, the variance V is set to a value leading to a low likelihood that the detection vehicle and the communication vehicle are the same (in step S209). Hence, with the vehicle identification apparatus 10 in accordance with the first embodiment, when the calculation period T is equal to or less than the threshold Tmin, the determination that the detection vehicle and the communication vehicle are the same can be prevented.

[1J] When the variance V is less than the threshold V1, it is determined that the communication vehicle and the detection vehicle are the same (in steps S103, S106). A likelihood that the communication vehicle and the detection vehicle are the same when the variance V is less than the threshold V1 is higher than a likelihood that the communication vehicle and the detection vehicle are the same when the variance V is the threshold V1. Hence, with the vehicle identification apparatus 10 in accordance with the first embodiment, since it doesn't have to be determined for all the pairs of detection and communication vehicles whether or not the detection vehicle and the communication vehicle are the same, a processing load can be reduced.

2. Second Embodiment

2-1. Differences from the First Embodiment

Figure 10:
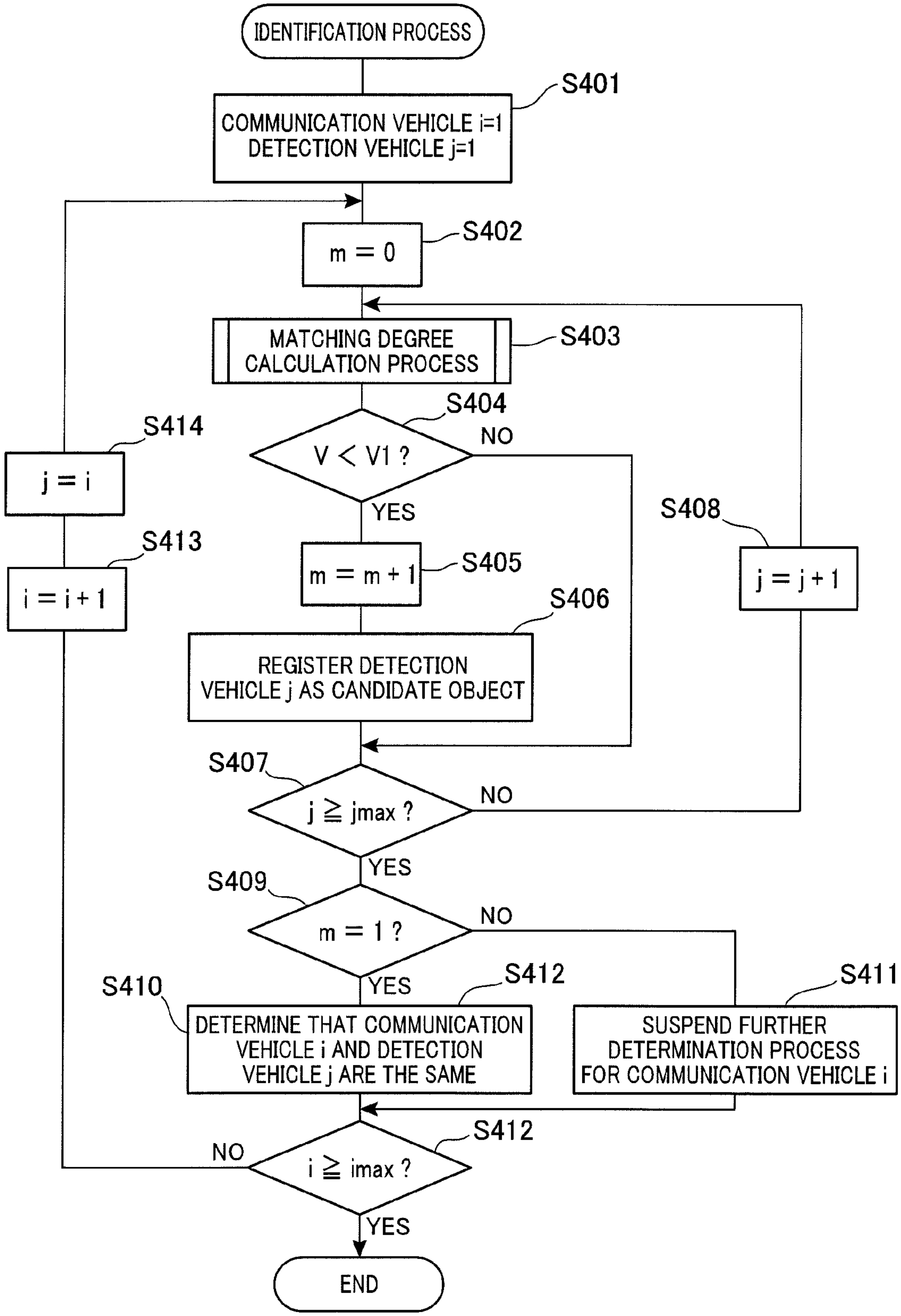
FIG. 10 shows a flowchart of an identification process in accordance with a second embodiment.

A second embodiment of the present invention will now be explained that is similar in configuration to the first embodiment except that an identification process shown in FIG. 10 is performed in place of the identification process shown in FIG. 4. Only differences of the second embodiment from the first embodiment will be explained.

2-2. Identification Process

An identification process performed in the identification unit 14 of the second embodiment will now be explained with reference to a flowchart of FIG. 10. Since operations in steps S401, S403, S404, S407, S408, S410, S412-S414 of FIG. 10 are similar to the operations in steps S101-S109 of FIG. 4, respectively, explanations of them will not be repeated.

First, in step S401, the value of the variable i representing a communication vehicle to be processed is set to 1 and the value of the variable j representing a detection vehicle to be processed is set to 1. Thereafter, in step S402, the value of a variable m for counting the number of candidate objects is set to 0.

Subsequently, in step S403, the matching degree calculation process is performed. Thereafter, in step S404, it is determined whether or not the calculated variance V is less than the threshold V1. If it is determined in step S404 that the variance V is less than the threshold V1, then in step S405 the value of the variable m is incremented by one. After the detection vehicle j is registered as a candidate object in step S406, the process proceeds to step S407. That is, when it is likely that the communication vehicle i and the detection vehicle j are the same, the detection vehicle j is registered as a candidate object. Meanwhile, if it is determined in step S404 that the variance V is equal to or greater than the threshold V1, then the process skips steps S405-S406 and proceeds to step S407.

In step S407, it is determined whether or not the value of the variable j is equal to or greater than the maximum number jmax. If it is determined in step S407 that the value of the variable j is less than the maximum number jmax, then the value of variable j is incremented by one and the process returns to step S403.

Meanwhile, it is determined in step S407 that the value of the variable j is equal to or greater than the maximum number jmax, then it is determined in step S409 whether or not the value of the variable m is 1.

If is determined in step S409 that the value of the variable m is 1 (that is, one candidate object is registered), then it is determined in step S410 that the communication vehicle i and the detection vehicle j are the same and the process proceeds to step S412. If is determined in step S409 that the value of the variable m is not 1 (that is, there are no registered candidate objects or a plurality of registered candidate objects), then in step S411 further identification processes are suspended for the communication vehicle i and the process proceeds to step S412. In this way, when there are no registered candidate objects or a plurality of registered candidate objects for the communication vehicle j, the identification unit 14 fails to determine that only one of the detection vehicles and the communication vehicle j are the same.

In step S412, it is determined whether or not the value of the variable i is equal to or greater than the maximum number i max. If it is determined in step S412 that the value of the variable i is less than the maximum number imax, then the value of variable i is incremented by one and the process returns to step S402. Meanwhile, it is determined in step S412 that the value of the variable i is equal to or greater than the maximum number imax, then the process of FIG. 10 ends.

2-3. Benefits

The second embodiment can provide similar benefits [1A]-[1I] as provided in the first embodiment.

[2A] When there are no detection vehicles or a plurality of detection vehicles for each of which the variance V is less than the threshold V1, further identification processes are suspended for the communication vehicle i being processed. Therefore, with the vehicle identification apparatus 10 of the second embodiment, false determinations such that the communication vehicle and the detection vehicle are the same can be prevented from occurring when the communication vehicle and the detection vehicle are actually distinct from each other.

3. Third Embodiment 3-1. Differences from the First Embodiment

Figure 11:
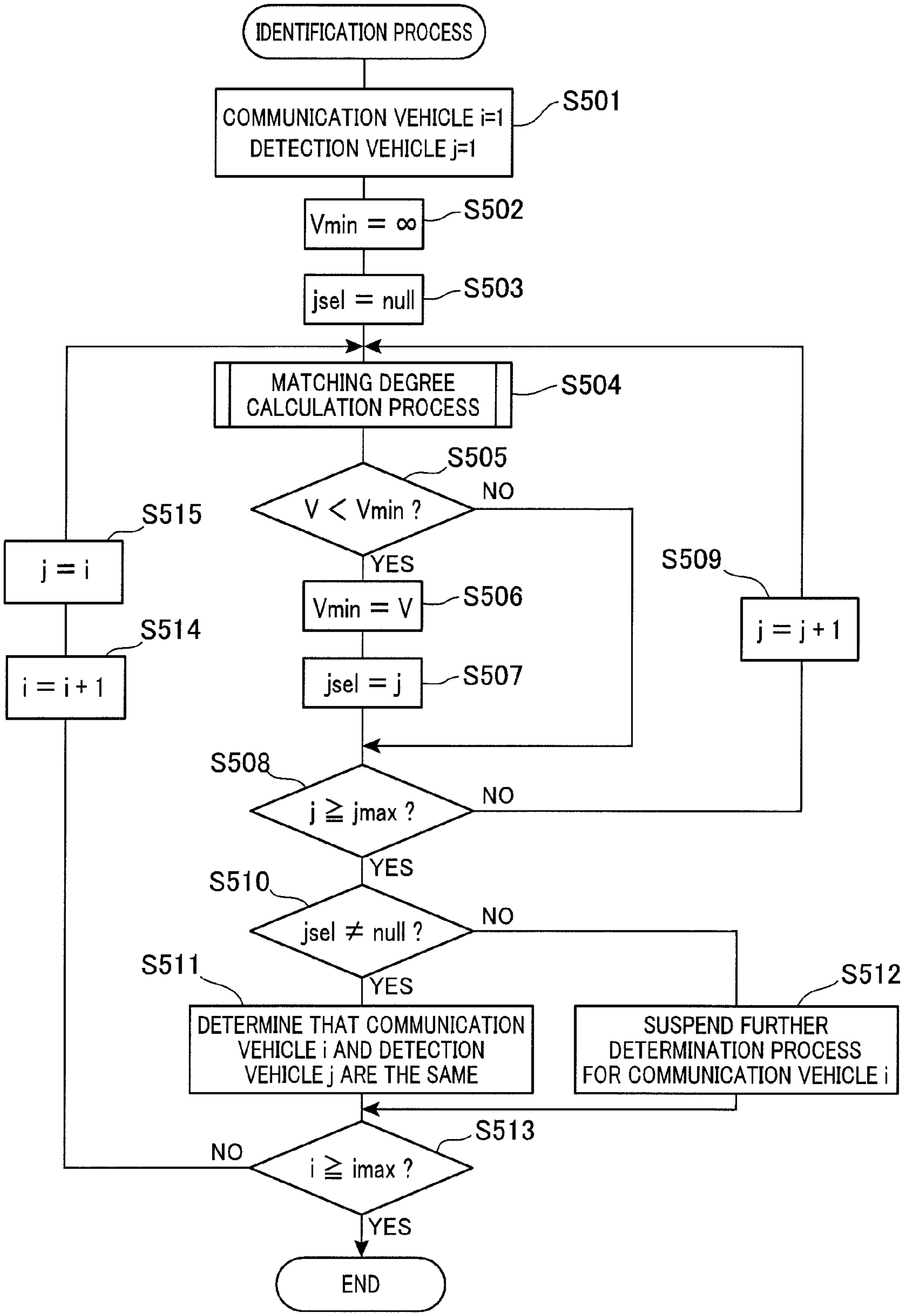
FIG. 11 shows a flowchart of an identification process in accordance with a third embodiment.

A third embodiment of the present invention will now be explained that is similar in configuration to the first embodiment except that an identification process shown in FIG. 11 is performed in place of the identification process shown in FIG. 4. Only differences of the third embodiment from the first embodiment will be explained.

3-2. Identification Process

An identification process performed in the identification unit 14 of the third embodiment will now be explained with reference to a flowchart of FIG. 11. Since operations in steps S501, S504, S508, S509, S511, S513-S515 of FIG. 11 are similar to the operations in steps S101, S102, S104-S109 of FIG. 4, respectively, explanations of them will not be repeated.

First, in step S501, the value of the variable i representing a communication vehicle to be processed is set to 1 and the value of the variable j representing a detection vehicle to be processed is set to 1. Thereafter, the value of a variable Vmin described later is set to infinity in step S502 and the value of a variable jsel described later is set to null (indicating that there is nothing remaining to be processed) in step S503.

Subsequently, in step S504, the matching degree calculation process is performed. Thereafter, in step S505, it is determined whether or not the calculated variance V is less than the threshold Vmin. If it is determined in step S505 that the variance V is less than the threshold Vmin, then the value of the threshold Vmin is set to the current value of the variance V in step S506 and the value of the variable jsel is set to the current value of the variable j in step S507. Thereafter, the process proceeds to step S508. That is, the value of the threshold Vmin is reduced to the current value of the variance V and the current value of the variable j corresponding thereto is substituted to the variable jsel. Such settings lead to the threshold Vmin set to the minimum value of the variance of V and the variable jsel set to the value of the variable i corresponding to the minimum value of the variance V.

If it is determined in step S505 that the variance V is equal to or greater than the threshold Vmin, then process skips steps S506-S507 and proceeds to step S508.

In step S508, it is determined whether or not the value of the variable j is equal to or greater than the maximum number jmax. If it is determined in step S508 that the value of the variable j is less than the maximum number jmax, then in step S509 the value of variable j is incremented by one and the process returns to step S504.

Meanwhile, if it is determined in step S508 that the value of the variable j is equal to or greater than the maximum number jmax, then it is determined in step S510 whether or not the value of the variable jsel is null.

If it is determined in step S510 that the value of the variable jsel is not null, then it is determined in step S511 that the communication vehicle i and the detection vehicle jsel are the same and the process proceeds to step S513. That is, it is determined that one of the detection vehicles j=1, . . . , jmax having the highest matching degree (or the smallest variance V) is the same as the communication vehicle i.

Meanwhile, if it is determined in step S510 that the value of the variable jsel is null, then in step S512 further identification processes are suspended for the communication vehicle i and the process proceeds to step S513. That is, when the value of the variance V for each of the detection vehicles j=1, . . . , jmax is infinity, the identification unit 14 fails to determine that one of the detection vehicles and the communication vehicle being processed are the same and suspends further identification processes for the communication vehicle i.

In step S513, it is determined whether or not the value of the variable i is equal to or greater than the maximum number i max. If it is determined in step S513 that the value of the variable i is less than the maximum number imax, then the value of variable i is incremented by one and the value of the variable j is set to 1 in step S515. Thereafter the process returns to step S504. Meanwhile, if it is determined in step S513 that the value of the variable i is equal to or greater than the maximum number imax, then the process of FIG. 11 ends.

3-3. Benefits

The third embodiment can provide similar benefits [1A]-[1I] as provided in the first embodiment. The third embodiment can provide following further benefits.

[3A] A pairwise combination of the detection and communication vehicles having a minimum value of the variance V corresponding to the highest likelihood that they are the same are determined, for which combination it is determined that the detection and communication vehicles are the same (in steps S504-S509, S511). Therefore, with the vehicle identification apparatus 10 of the third embodiment, only one pairwise combination of detection and communication vehicles are determined to have the highest likelihood that they are the same.

4. Fourth Embodiment 4-1. Differences from the First Embodiment

Figure 12:
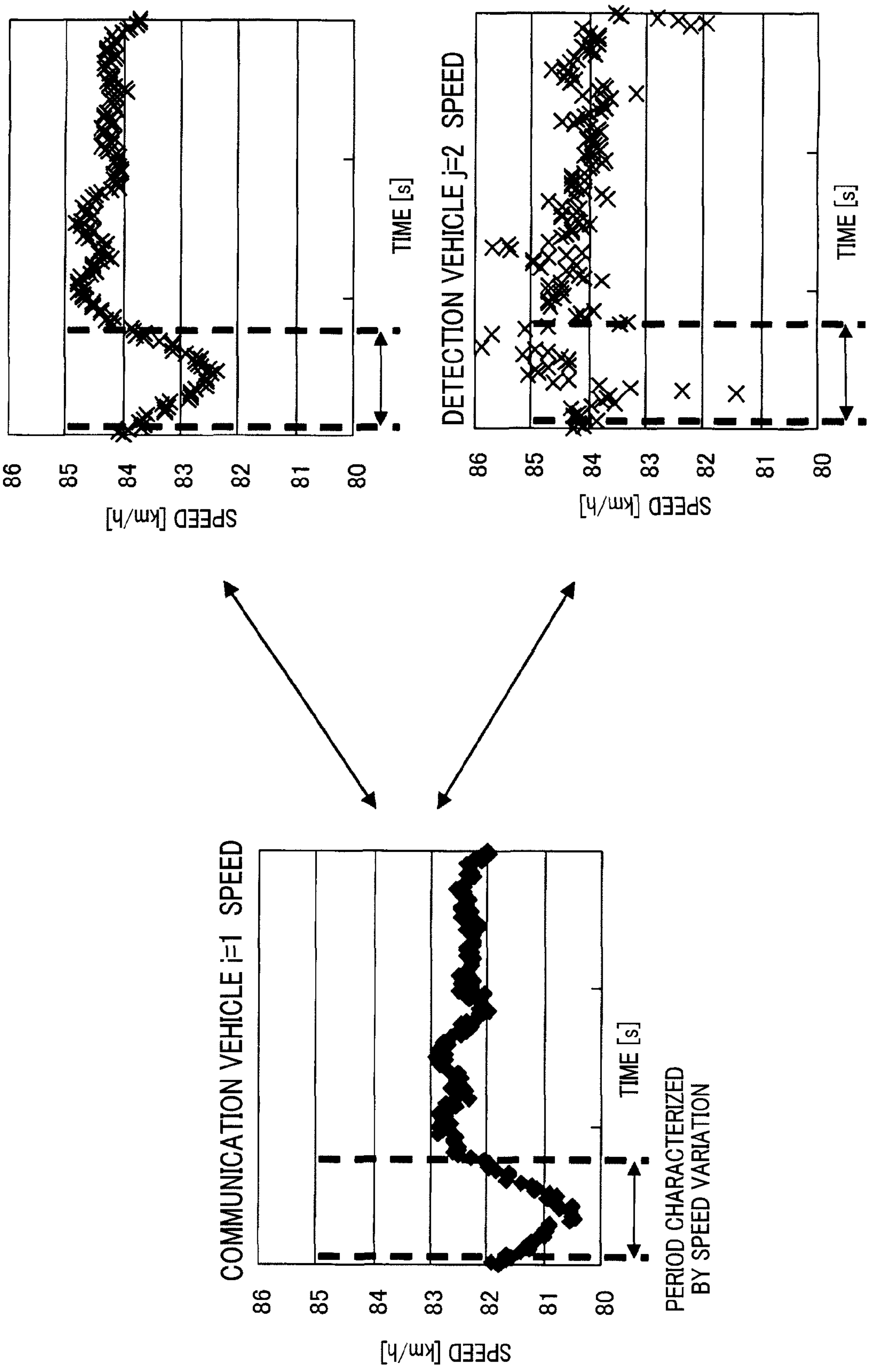
FIG. 12 shows an example of a time period characterized by a speed variation.

A fourth embodiment of the present invention will now be explained that is similar in configuration to the first embodiment except that, as shown in FIG. 12, a weight for a portion of the calculation period T featuring a speed variation is set greater than a weight for a remainder of the calculation period T. More specifically, the identification process of FIG. 8 is replaced with the identification process of FIG. 13 described later. Therefore, only differences of the fourth embodiment from the first embodiment will be explained.

4-2. Matching Degree Calculation Process

Figure 13:
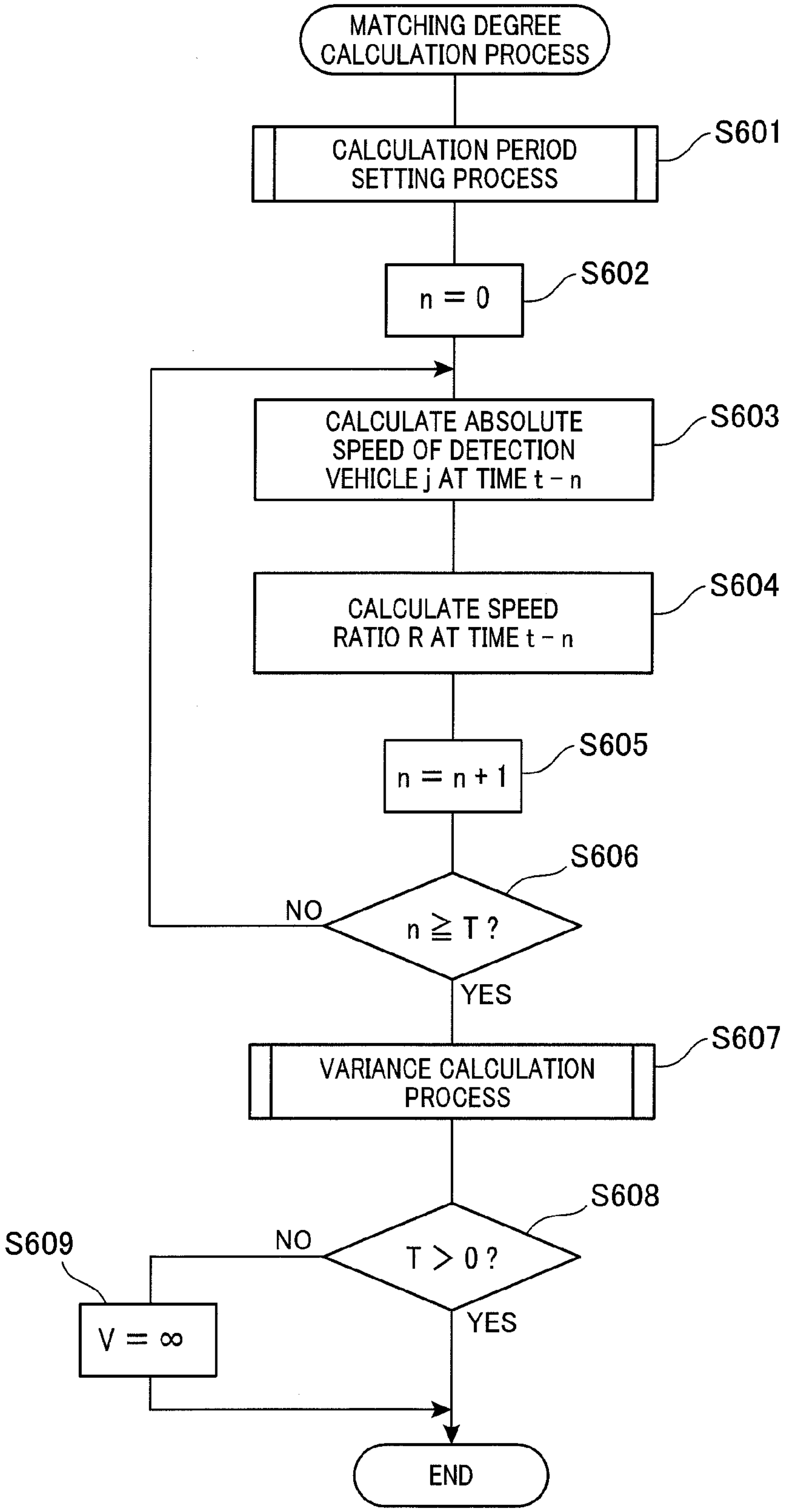
FIG. 13 shows a flowchart of an identification process in accordance with a fourth embodiment.

A matching degree calculation process performed in the identification unit 14 of the fourth embodiment will now be explained with reference to a flowchart of FIG. 13. Since operations other than the operation in step S607 of FIG. 10 are similar to the operations other than the operation in step S207 of FIG. 8, explanations of them will not be repeated.

Figure 14:
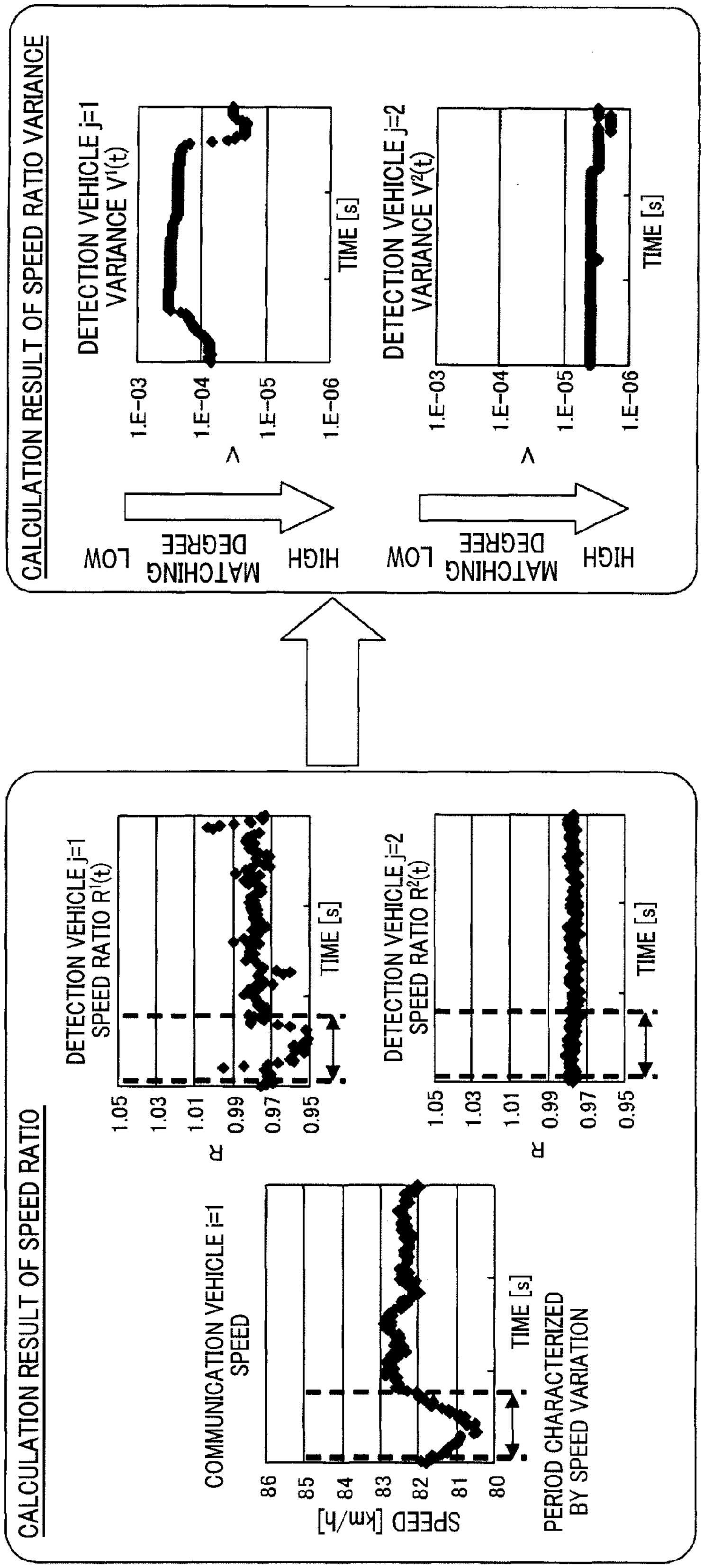
FIG. 14 shows an example of calculating a variant in accordance with the fourth embodiment.

In step S607, a variance calculation process is performed, where a variance V of the speed ratio R is calculated taking into account a portion of the calculation period T in which the speed varies characteristically with time (referred to as a characteristic period). More specifically, as shown FIG. 14, the speed Vic(t) of the communication vehicle i is differentiated to obtain an acceleration A ic(t). A time period in which the acceleration Aic(t) is equal to or greater than a threshold A1 (as a second predetermined threshold) is regarded as a characteristic period having a significant speed variation over time. The threshold A1 is a threshold defined as a criterion based on which it is determined whether or not the speed variation over time is characteristic. As shown in Eq, 6, the speed ratio R is weighted to calculate the variance of the speed ratio R. For example, weights may be defined such that WAC=W1 (W1>1) for Aic(t)≥A1 and WAC=1 for Aic(t)<A1.

$$V^j(t) = \frac{1}{T}\sum_{n=0}^{T-1} W_{AC}\{R^j(t-n) - R_A^j\}^2 \tag{6}$$

Figure 15:
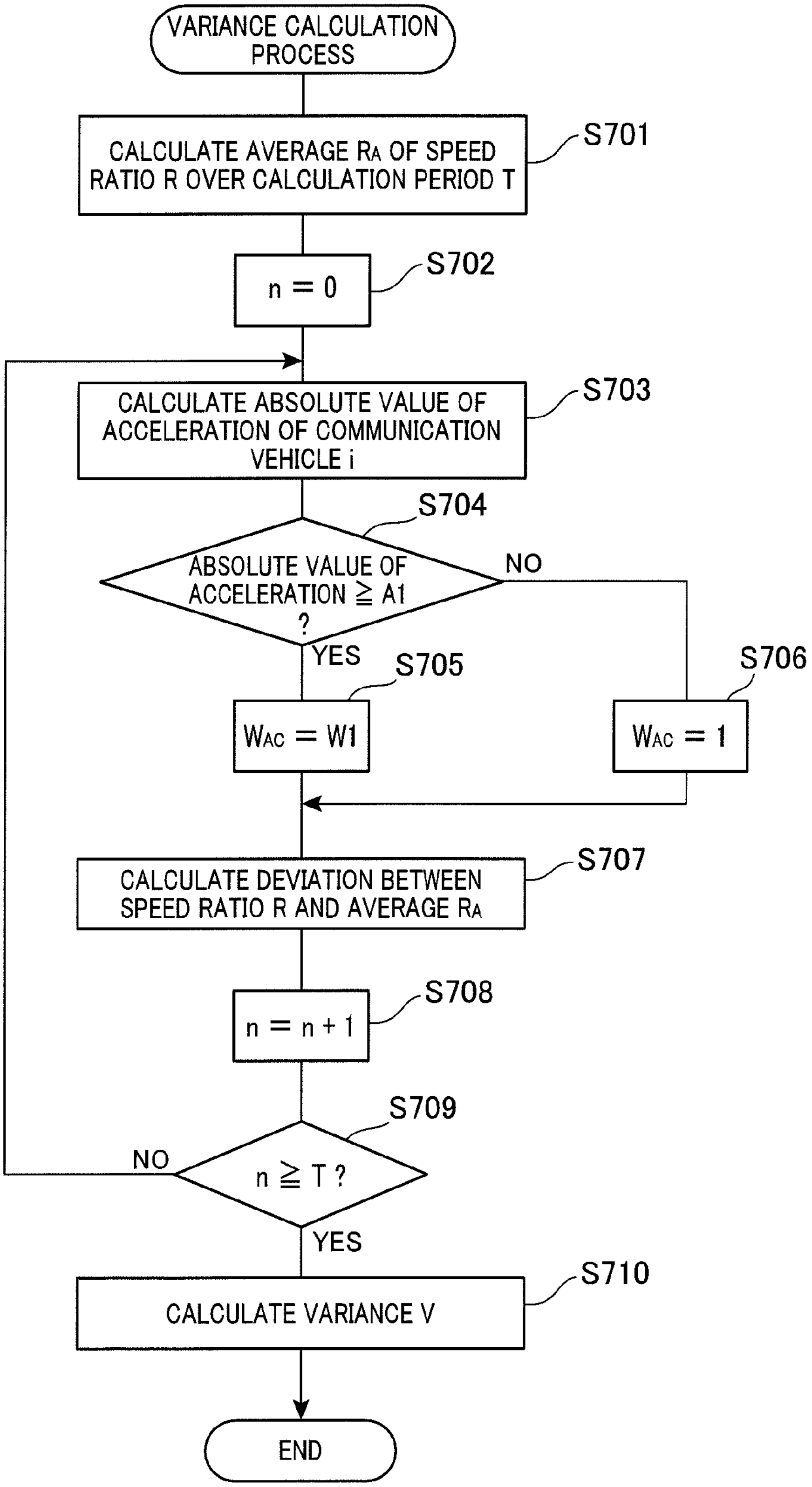
FIG. 15 shows a flowchart of a variant calculation process in accordance with the fourth embodiment.

Such a variance calculation process will now be explained in more detail with reference to a flowchart of FIG. 15.

First, in step S701, an average RjA of the speed ratio R over the calculation period T is calculated. Subsequently, in step S702, the value of the variable n is set to 0. Thereafter, in step S703, an absolute value of the acceleration of the communication vehicle i is calculated according to the Eq. (7).

$$|A^i_c(t-n)| = |dV^i_c(t-n)/dt| \tag{7}$$

Subsequently, in step S704, it is determined whether or not the absolute value of the acceleration calculated is equal to or greater than the threshold A1. If it is determined in step S704 that the absolute value of the acceleration is equal to or greater than the threshold A1, then in step S705 the weighting factor WAC is set to W1 i.e., WAC=W1. If it is determined in step S704 that the absolute value of the acceleration is less than the threshold A1, then in step S706 the weighting factor WAC is set to 1, i.e., WAC=1.

Subsequently, in step 707, a deviation of the speed ratio from the average RjA is calculated taking into account the weighting factor Wac according to Eq. (8).

$$\sigma(t-n) = W_{AC}\{R^j(t-n) - R_A^j\}^2 \tag{8}$$

Subsequently, in step S708, the value of the variable n is incremented by one. Thereafter, in step S709, it is determined whether or not the value of the variable n is equal to or greater than the calculation period T. That is, for all the information stored in the last T cycles, it is determined whether or not the operations in steps S703-707 have been performed. If it is determined in step S709 that the value of the variable n is less than the value of the calculation period T, then the process returns to step S703.

Meanwhile if it is determined in step S709 that the value of the variable n is equal to or greater than the value of the calculation period T, then in step S710 a variance V of the speed ratio R is calculated taking into account the weighting factor Wac according to the Eq. (9). Thereafter, the variance calculation process of FIG. 15 ends.

$$V = \frac{1}{T}\sum_{n=0}^{T-1} \sigma(t-n) \tag{9}$$

4-3. Benefits

The fourth embodiment can provide similar benefits [1A]-[1J] as provided in the first embodiment. The fourth embodiment can provide following further benefits.

[4A] In the matching degree calculation process set forth above, the variance V is calculated on the basis of characteristics of the change over time of the speed of the communication vehicle being processed. Therefore, with the vehicle identification apparatus 10 of the fourth embodiment, the accuracy of determining whether or not the detection vehicle and the communication vehicle are the same can be enhanced as compared to when configured such that the variance V is calculated regardless of characteristics of the change over time of the speed of the communication vehicle.

[4B] In the calculation of the variance V, the weighting factor set for a portion of the calculation period T in which the acceleration Aic(t) is equal to or greater than the threshold A1 is set greater than the weighting factor set for the remainder of the calculation period T. Therefore, even when the change over time of the speed of the communication vehicle is relatively small, it can be determined more accurately whether or not the detection vehicle and the communication vehicle are the same. In some alternative embodiments, the variance V may be calculated not on the basis of characteristics of the change over time of the speed of the communication vehicle being processed, but on the basis of characteristics of the change over time of the speed of the detection vehicle being processed. This can also provide similar benefits as in the present embodiment.

5. Fifth Embodiment 5-1. Differences From First Embodiment

Figure 16:
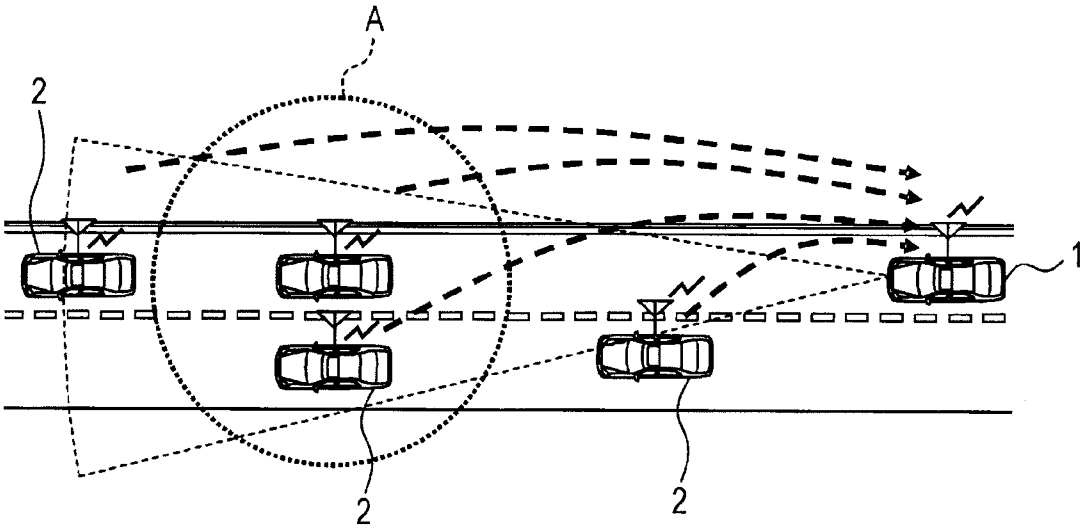
FIG. 16 shows an example of narrowing candidates on the basis of position information.

A fifth embodiment of the present invention will now be explained that is similar in configuration to the first embodiment except that pairwise combinations of communication and detection vehicles that are likely the same are narrowed by comparing the position of the detection vehicle and the position of the communication vehicle. For example, as shown in FIG. 16, candidates, each of which is a pairwise combination of detection and communication vehicles that are likely the same, are narrowed by comparing the absolute position of the other vehicle (communication vehicle) 2 indicated by the information received by the wireless communication unit 23 and the absolute position of the other vehicle (detection vehicle) 2 detected by the peripheral monitoring sensor 21. In an example of FIG. 16, candidates, each of which is a pairwise combination of the detection vehicle and the communication vehicle i that are likely the same, are limited to two candidates such that for each candidate the detection vehicle is present within a disk area centered at the communication vehicle i. It is determined for such candidates whether or not the detection and communication vehicle are the same on the basis of the position information of them. That is, in the fifth embodiment, prior to determining whether or not the detection and communication vehicle are the same on the basis of their speed behaviors, candidates are narrowed on the basis of the position information.

5-2. Identification Process

Figure 17:
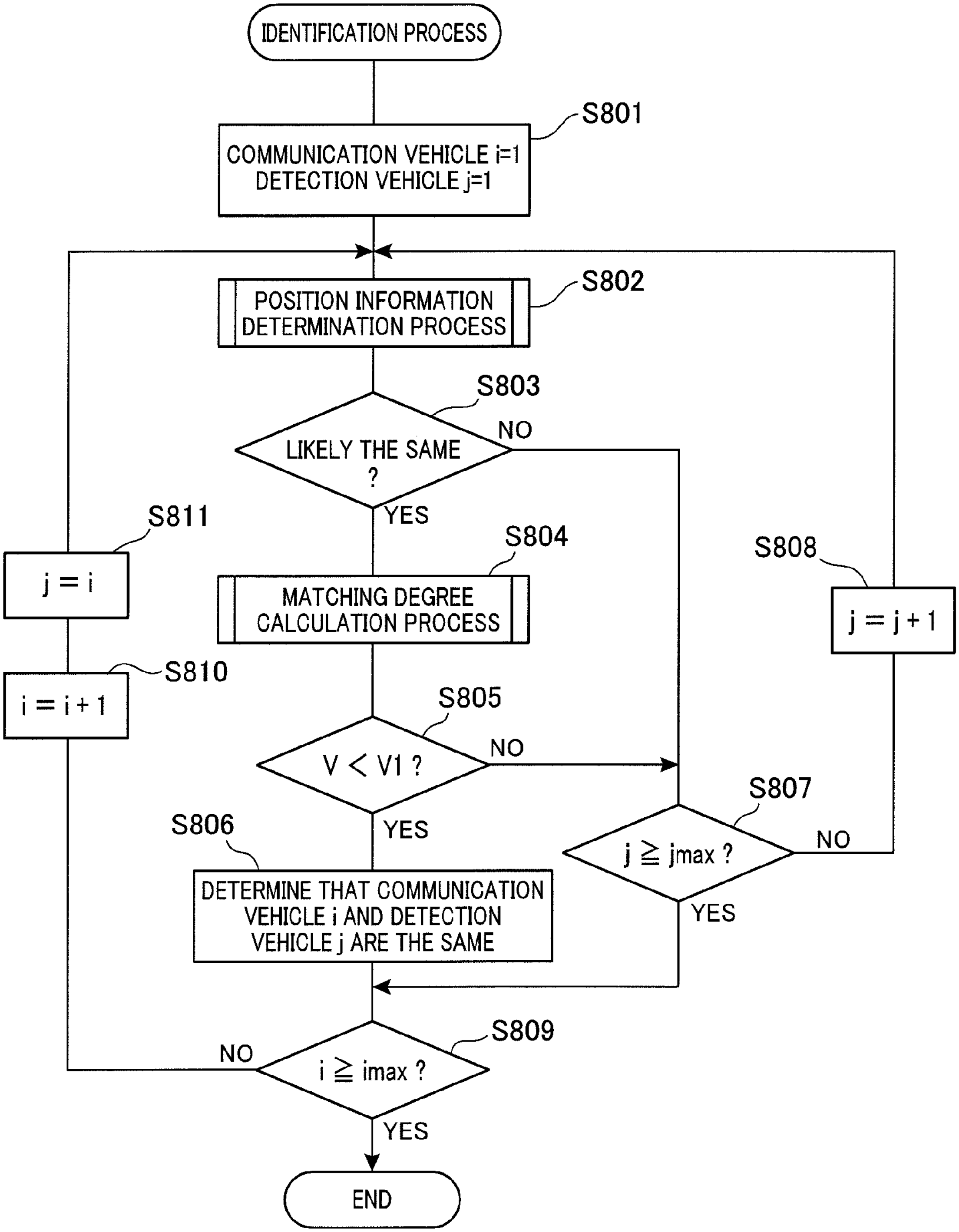
FIG. 17 shows a flowchart of an identification process in accordance with a fifth embodiment.

The fifth embodiment of the present invention will now be explained that is similar in configuration to the first embodiment except that an identification process shown in FIG. 17 is performed in place of the identification process shown in FIG. 4. In the identification process shown in FIG. 17, operations in steps S802-S803 are additionally performed as compared to the identification process shown in FIG. 4. Only differences of the fifth embodiment from the first embodiment will be explained.

In step S802, a position information determination process is performed, where a likelihood that the communication vehicle i and the detection vehicle j are the same is determined on the basis of the position information. If it is determined in step S803 that the communication vehicle i and the detection vehicle j are likely the same, then in step S804 the matching degree calculation process is performed. If is determined in step S803 that the communication vehicle i and the detection vehicle j are unlikely the same, then the process skips the matching degree calculation process.

Figure 18:
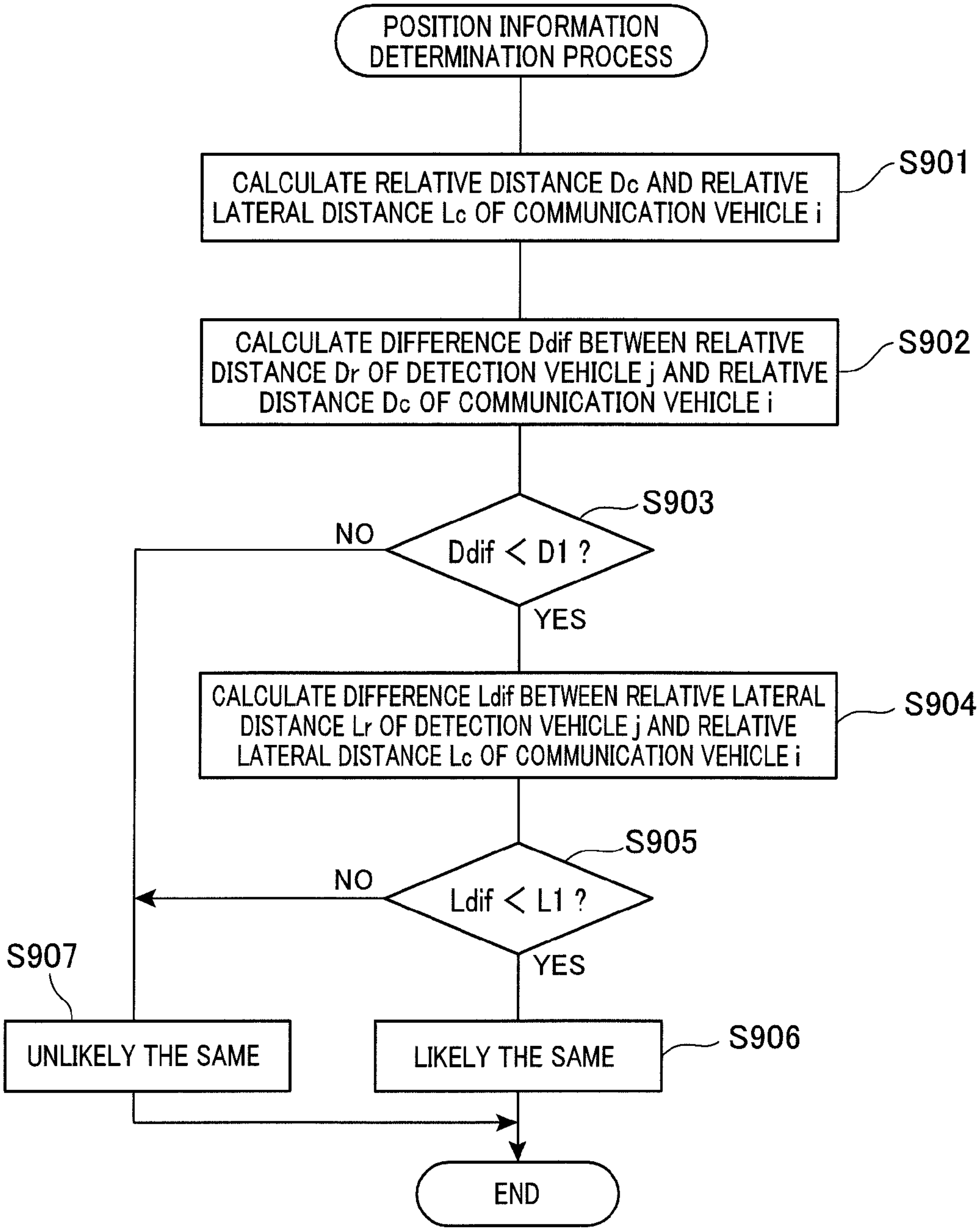
FIG. 18 shows a flowchart of a position information determination process in accordance with a fifth embodiment.

The position information determination process performed in step S802 of FIG. 17 will now be explained with reference to a flowchart of FIG. 18. In step S901, a relative distance Dc and a relative lateral distance Lc of the communication vehicle i are calculated from the absolute position of the subject vehicle 1 and the absolute position of the communication vehicle i. In a horizontal plane with an X-axis extending in a forward direction of the subject vehicle 1 and a Y-axis extending perpendicular to the X-axis (i.e., in a widthwise direction of the subject vehicle 1), the relative lateral distance Lc and the relative distance Dc are X- and Y-coordinates, respectively.

Subsequently, in step S902, a difference Ddif between a relative distance Dr of the detection vehicle j and a relative distance Dc of the communication vehicle i is calculated and it is determined in step S903 whether or not the calculated difference Ddif is less than a threshold D1. The threshold D1 is defined as a criterion on the basis of which it is determined whether or not the detection vehicle j and the communication vehicle i are likely the same.

If it is determined in step S903 that the difference Ddif is less than the threshold D1, then in step S904 a difference Ldif between a relative lateral distance Lr of the detection vehicle j and a relative lateral distance Lc of the communication vehicle i is calculated. In step S905, it is determined whether or not the calculated difference Ldif is less than a threshold L1. The threshold L1 is defined as a criterion on the basis of which it is determined whether or not the detection vehicle j and the communication vehicle i are likely the same.

If it is determined in step S905 that the difference Ldif is less than the threshold L1, then it is determined in step S906 that the communication vehicle i and that the detection vehicle j are likely the same. Thereafter, the position information determination process of FIG. 18 ends.

If it is determined in step S903 that the difference Ddif is equal to or greater than the threshold D1 or if it is determined in step S905 that the difference Ldif is equal to or greater than the threshold L1, then the process proceeds to step S907, where it is determined that the communication vehicle i and that the detection vehicle j are unlikely the same. Thereafter, the position information determination process of FIG. 18 ends.

5-3. Benefits

The fifth embodiment set forth above can provide similar benefits [1A]-[1J] as provided in the first embodiment and can provide following further benefits.

[5A] Candidates, each of which is a pairwise combination of detection and communication vehicles that are likely the same, are narrowed on the basis of the position of the detection vehicle detected by the peripheral monitoring sensor 21 and the position of the communication vehicle indicated by the information received by the wireless communication unit 23. According to the fifth embodiment, processing load can be reduced and false determinations are prevented from occurring.

6. Other Embodiments

There will now be explained other embodiments that may be devised without departing from the spirit and scope of the present invention. Only differences from the above embodiments will be explained.

[6A] In the embodiments set forth above, the calculation period T is set to a duration in which the other vehicle 2 being processed is continuously detected without being lost. Alternatively, the calculation period T may be set to a portion of such a duration which the other vehicle 2 being processed is continuously detected without being lost.

[6B] Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle identification apparatus mounted in a vehicle provided with a detection unit configured to detect a speed of a first other vehicle and a communication unit configured to receive information indicative of a speed of a second other vehicle from the second other vehicle, the apparatus comprising:

a calculation unit configured to calculate an indicator value indicative of a likelihood that the first other vehicle and the second other vehicle are the same, the indicator value being defined as a function of the speed of the first other vehicle detected by the detection unit and the speed of the second other vehicle indicated by the information received by the communication unit; and a determination unit configured to determine whether or not the first other vehicle and the second other vehicle are the same on the basis of the indicator value calculated by the calculation unit, wherein the calculation unit is configured to calculate the indicator value on the basis of a change over time of the speed of the first other vehicle and a change over time of the speed of the second other vehicle, the calculation unit is further configured to calculate the indicator value on the basis of a variation in speed ratio of the speed of the second other vehicle to the speed of the first other vehicle during a calculation period in which the indicator value is calculated.

2. A vehicle identification apparatus mounted in a vehicle provided with a detection unit configured to detect a speed of a first other vehicle and a communication unit configured to receive information indicative of a speed of a second other vehicle from the second other vehicle, the apparatus comprising:

a calculation unit configured to calculate an indicator value indicative of a likelihood that the first other vehicle and the second other vehicle are the same, the indicator value being defined as a function of the speed of the first other vehicle detected by the detection unit and the speed of the second other vehicle indicated by the information received by the communication unit; and a determination unit configured to determine whether or not the first other vehicle and the second other vehicle are the same on the basis of the indicator value calculated by the calculation unit, wherein the calculation unit is configured to calculate the indicator value on the basis of a change over time of the speed of the first other vehicle and a change over time of the speed of the second other vehicle, the calculation unit is further configured to calculate the indicator value by correlating the change over time of the speed of the first other vehicle with the change over time of the speed of the second other vehicle during a calculation period in which the indicator value is calculated, the calculation unit is further configured to, prior to calculating the indicator value, set the calculation period as a function of a detection condition for the first other vehicle.

3. The apparatus of claim 2, wherein the calculation unit is configured to set the calculation period within a duration in which the first other vehicle is detected by the detection unit continuously without being lost.

4. The apparatus of claim 2, wherein the calculation unit is configured to set the calculation period to a duration in which the first other vehicle is detected by the detection unit continuously without being lost.

5. A vehicle identification apparatus mounted in a vehicle provided with a detection unit configured to detect a speed of a first other vehicle and a communication unit configured to receive information indicative of a speed of a second other vehicle from the second other vehicle, the apparatus comprising:

a calculation unit configured to calculate an indicator value indicative of a likelihood that the first other vehicle and the second other vehicle are the same, the indicator value being defined as a function of the speed of the first other vehicle detected by the detection unit and the speed of the second other vehicle indicated by the information received by the communication unit; and a determination unit configured to determine whether or not the first other vehicle and the second other vehicle are the same on the basis of the indicator value calculated by the calculation unit, wherein the calculation unit is configured to calculate the indicator value on the basis of a change over time of the speed of the first other vehicle and a change over time of the speed of the second other vehicle, the calculation unit is further configured to calculate the indicator value by correlating the change over time of the speed of the first other vehicle with the change over time of the speed of the second other vehicle during a calculation period in which the indicator value is calculated, the calculation unit is further configured to, when the calculation period is greater than a first predetermined threshold, calculate the indicator value by correlating the change over time of the speed of the first other vehicle with the change over time of the speed of the second other vehicle during the calculation period.

6. The apparatus of claim 5, wherein the calculation unit is configured to, when the calculation period is equal to or less than the first predetermined threshold, set the indicator value to a value indicative of a lower likelihood that the first and second other vehicles are the same as compared to when the calculation period is greater than the first predetermined threshold.

7. A vehicle identification apparatus mounted in a vehicle provided with a detection unit configured to detect a speed of a first other vehicle and a communication unit configured to receive information indicative of a speed of a second other vehicle from the second other vehicle, the apparatus comprising:

a calculation unit configured to calculate an indicator value indicative of a likelihood that the first other vehicle and the second other vehicle are the same, the indicator value being defined as a function of the speed of the first other vehicle detected by the detection unit and the speed of the second other vehicle indicated by the information received by the communication unit; and a determination unit configured to determine whether or not the first other vehicle and the second other vehicle are the same on the basis of the indicator value calculated by the calculation unit, wherein the calculation unit is configured to calculate the indicator value on the basis of a change over time of the speed of the first other vehicle and a change over time of the speed of the second other vehicle, the calculation unit is further configured to calculate the indicator value by correlating the change over time of the speed of the first other vehicle with the change over time of the speed of the second other vehicle during a calculation period in which the indicator value is calculated, the calculation unit is further configured to calculate the indicator value on the basis of characteristics of either one of the change over time of the speed of the first other vehicle and the change over time of the speed of the second other vehicle, the calculation unit is further configured to set a weighting factor for a characteristic portion of the calculation period in which an acceleration of the first other vehicle or an acceleration of the second other vehicle is equal to or greater than a second predetermined threshold, greater than a weighting factor for the remainder of the calculation period in which the acceleration is less than the second predetermined threshold.

* * * * *